(12) United States Patent
Miyake et al.

(10) Patent No.: US 7,649,453 B2
(45) Date of Patent: *Jan. 19, 2010

(54) REMOTE CONTROL DEVICE

(75) Inventors: Yasunari Miyake, Daito (JP); Hideki Tanabe, Daito (JP); Yasuo Masaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 365 days.

This patent is subject to a terminal disclaimer.

(21) Appl. No.: 11/641,167

(22) Filed: Dec. 19, 2006

(65) Prior Publication Data

US 2007/0140697 A1 Jun. 21, 2007

(30) Foreign Application Priority Data

Dec. 19, 2005 (JP) .............................. 2005-364645

(51) Int. Cl.
*G08B 1/08* (2006.01)
*G08C 19/00* (2006.01)

(52) U.S. Cl. .............. 340/539.1; 340/5.64; 340/825.71; 340/825.72

(58) Field of Classification Search .............. 340/539.1, 340/5.64, 5.1, 5.22, 5.23, 825.57, 825.71, 340/825.77, 825.72
See application file for complete search history.

(56) References Cited

U.S. PATENT DOCUMENTS

2005/0240962 A1* 10/2005 Cooper et al. ................. 725/38
2007/0015579 A1* 1/2007 Masaki et al. ................. 463/37
2007/0229671 A1* 10/2007 Takeshita et al. ......... 348/211.2

FOREIGN PATENT DOCUMENTS

| JP | 2-245212 | 10/1990 |
|---|---|---|
| JP | 4-113799 | 4/1992 |
| JP | 6-16832 | 1/1994 |
| JP | 8-111893 | 4/1996 |
| JP | 8-122435 | 5/1996 |
| JP | 8-275259 | 10/1996 |
| JP | 11-112421 | 4/1999 |
| JP | 2000-134681 | 5/2000 |

(Continued)

OTHER PUBLICATIONS

Patent Abstracts of Japan, Publication No. 08-275259, Publication Date: Oct. 18, 1996 (1 page) (Previously Cited).

(Continued)

*Primary Examiner*—Toan N Pham
(74) *Attorney, Agent, or Firm*—Osha • Liang LLP

(57) ABSTRACT

A remote control device capable of controlling a plurality of apparatuses is provided. The remote control device includes an external slit portion, an internal slit portion, a light receiving element, and a control circuit. The external slit portion and internal slit portion are arranged such that a prolonged line of each opening crosses a reception region of the light receiving element. The light receiving element is connected to the control circuit via a signal line. The external slit portion is formed such that the opening is located vertically when the remote control device is operated. The internal slit is formed such that the longitudinal direction of the opening is placed vertically when the remote control device is operated.

24 Claims, 35 Drawing Sheets

FOREIGN PATENT DOCUMENTS

| JP | 2001-217850 | 8/2001 |
| --- | --- | --- |
| JP | 2002-124909 | 4/2002 |
| JP | 2003-284169 | 10/2003 |
| JP | 2004-173241 | 6/2004 |
| JP | 2004-253869 | 9/2004 |
| JP | 2005-39745 | 2/2005 |
| JP | 2005-43061 | 2/2005 |

OTHER PUBLICATIONS

Japanese Office Action for Japanese Application No. 2005-364645, mailed on Feb. 19, 2008 (5 pages).
Patent Abstracts of Japan for Japanese Publication No. 2000-134681, Publication date May 12, 2000 (1 page).
Patent Abstracts of Japan for Japanese Publication No. 02-245212, Publication date Oct. 1, 1990 (1 page).
Patent Abstracts of Japan for Japanese Publication No. 06-016832, Publication date Jan. 25, 1994 (1 page).
Patent Abstracts of Japan for Japanese Publication No. 11-112421, Publication date Apr. 23, 1999 (1 page).
Patent Abstracts of Japan for Japanese Publication No. 2005-043061, Publication date Feb. 17, 2005(1 page).
Patent Abstracts of Japan for Japanese Publication No. 2002-124909, Publication date Apr. 26, 2002 (1 page).
Patent Abstracts of Japan for Japanese Publication No. 2005-039745, Publication date Feb. 10, 2005 (1 page).
Patent Abstracts of Japan for Japanese Publication No. 08-122435, Publication date May 17, 1996 (1 page).
Patent Abstracts of Japan for Japanese Publication No. 2001-217850, Publication date Aug. 10, 2001 (1 page).
Patent Abstracts of Japan for Japanese Publication No. 2004-173241, Publication date Jun. 17, 2004 (1 page).
Patent Abstracts of Japan for Japanese Publication No. 04-113799, Publication date Apr. 15, 1992 (1 page).
Patent Abstracts of Japan, Publication No. 08-275259, Publication Date: Oct. 18, 1996, 1 page.
Patent Abstracts of Japan, Publication No. 2004-253869, Publication Date: Sep. 9, 2004, 1 page.
Patent Abstracts of Japan, Publication No. 08-111893, Publication Date: Apr. 30, 1996, 1 page.
Patent Abstracts of Japan, Publication No. 2003-284169, Publication Date: Oct. 3, 2003, 1 page.

* cited by examiner

```
┌─ 102
│  APPARATUS IS NOT AUTHENTICATED !
│
│  PLEASE OBTAIN APPARATUS INFORMATION.
└
```

(B)

```
┌─ 102
│  APPARATUS HAS ALREADY BEEN AUTHENTICATED.
│
│     THE FOLLOWING APPARATUS
│     HAS BEEN AUTHENTICATED.
│
│  MANUFACTURER CODE    ABC
│
│  APPARATUS NUMBER     HDDRECORDER-001
│
│  PRODUCTION NUMBER    12345678
└
```

FIG.16

MEMORY /520

| MANUFACTURER CODE=XYZ | 610 |
| APPARATUS NUMBER=AIR CONDITIONER 100 | 620 |
| PRODUCTION NUMBER=01234567 | 630 |

| BUTTON /640 | OPERATION DURING DEPRESSION /650 |
|---|---|
| NUMERIC BUTTON 1 | INVALID |
| NUMERIC BUTTON 2 | INVALID |
| ... | ... |
| NUMERIC BUTTON 0 | INVALID |
| CURSOR UP BUTTON | SELECT OPERATION MODE IN ORDER OF FAN ⇒ COOLER ⇒ DEHUMIDIFIER ⇒ HEATER |
| CURSOR DOWN BUTTON | SELECT OPERATION MODE IN ORDER OF FAN ⇒ HEATER ⇒ DEHUMIDIFIER ⇒ COOLER |
| CURSOR RIGHT BUTTON | SELECT OPERATION MODE IN ORDER OF SOFT ⇒ WEAK ⇒ STRONG AIR FLOW |
| CURSOR LEFT BUTTON | SWITCH BETWEEN AUTOMATIC OPERATION ⇔ MANUAL |
| FIRST UP BUTTON | INCREASE SETTING TEMPERATURE BY 1 DEGREE CELSIUS |
| FIRST DOWN BUTTON | DECREASE SETTING TEMPERATURE BY 1 DEGREE CELSIUS |
| SECOND UP BUTTON | INCREASE TIMER SETTING TIME BY 1 HOUR |
| SECOND DOWN BUTTON | DECREASE TIMER SETTING TIME BY 1 HOUR |
| ... | ... |

FIG.17

APPARATUS HAS ALREADY BEEN AUTHENTICATED.

THE FOLLOWING APPARATUS
HAS BEEN AUTHENTICATED

MANUFACTURER CODE   XYZ

APPARATUS NUMBER      AIR  CONDITIONER  100

PRODUCTION NUMBER      01234567

| CONTROL ITEM | CONTROL DATA |
|---|---|
| POWER ON | POWER ON SIGNAL |
| POWER OFF | POWER OFF SIGNAL |
| CHANNEL UP | CHANNEL UP SIGNAL |
| CHANNEL DOWN | CHANNEL DOWN SIGNAL |
| CHANNEL SELECTION | CHANNEL NUMBER |
| VOLUME UP | VOLUME UP SIGNAL |
| VOLUME DOWN | VOLUME DOWN SIGNAL |
| MUTE | MUTE INSTRUCTION SIGNAL |
| ... | ... |

FIG.30
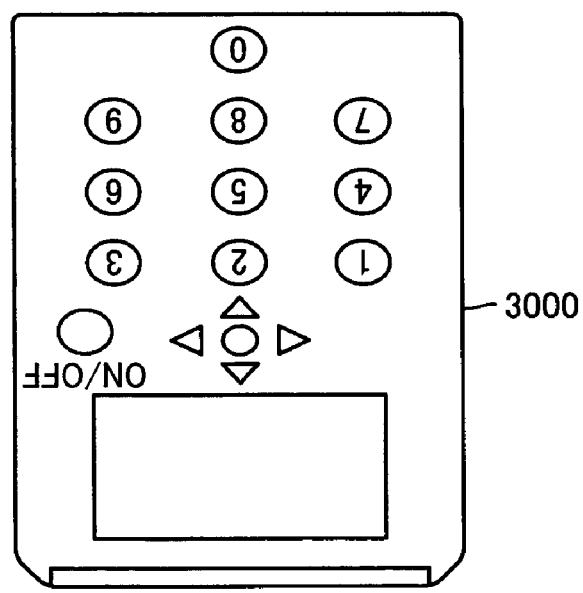
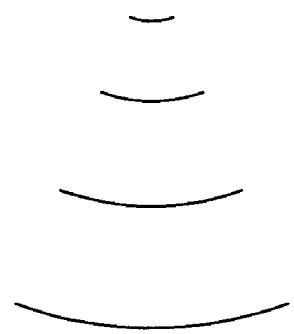
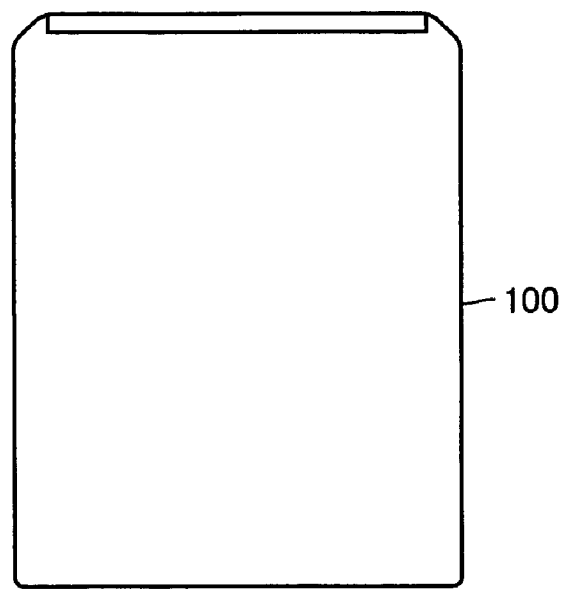

REMOTE CONTROL DEVICE

BACKGROUND OF THE INVENTION

1. Field of the Invention

The present invention relates to remote control devices. More particularly, the present invention relates to a remote control device capable of controlling a plurality of apparatuses.

2. Description of the Background Art

In the field of remote control devices capable of controlling a plurality of apparatuses, a terminal end user had to select the apparatus that is the subject of control (hereinafter, referred to as control target apparatus), and conduct manipulation such as entering the setting and data in order to control a certain control target apparatus.

In view of operating a remote control device capable of controlling a plurality of apparatuses, directed towards an apparatus of interest, the technique of functioning as a remote control device for a relevant apparatus is disclosed in Japanese Patent Laying-Open Nos. 08-275259, 2004-253869, 08-111893, and 2003-284169, for example.

According to the technique disclosed in Japanese Patent Laying-Open No. 08-275259, for example, an image pick up device such as a camera is required to transmit and receive an identification signal in the form of an optical signal. This leads to the problem that the remote control device will be increased in weight, and also significantly in cost.

There is also a problem that it is not easy for the user of the remote control device to properly direct the remote control device to the signal emitting region to obtain an identification signal.

SUMMARY OF THE INVENTION

In view of the foregoing, an object of the present invention is to provide a remote control device improved in convenience.

Another object of the present invention is to provide a remote control device capable of controlling a plurality of apparatuses without increase in weight or cost.

A further object of the present invention is to provide a remote control device capable of having the setting readily modified to function as a remote control device for a certain apparatus.

Still another object of the present invention is to provide a remote control device that can readily receive a signal from an apparatus emitting identification information.

In summary, according to an aspect of the present invention directed to the objects set forth above, a remote control device controlling an apparatus that emits an optical signal containing identification information is provided. The remote control device includes an optical system accepting an optical signal with incoming restricted in a lateral direction, a reception unit receiving an optical signal via the optical system, a conversion unit converting the optical signal received by the reception unit into an electrical signal, an identification information obtaining unit obtaining identification information from the electrical signal, a storage unit storing control data to control an apparatus, a display unit to provide a display for identifying an apparatus based on the identification information obtained by the identification information obtaining unit, an input unit accepting an input of an instruction, a generation unit generating a control signal to control an apparatus based on the instruction and the control data stored in the storage unit, and an emitting unit emitting a control signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 represents an image displayed on a display.

FIG. 16 represents data stored in a flash memory when an air conditioner is authenticated as the subject of control by a remote control device according to an embodiment of the present invention.

FIG. 17 represents an image displayed when a remote control device according to an embodiment of the present invention recognizes an air conditioner.

FIG. 30 represents a signal communication state between a remote control device according to an embodiment of the present invention and a remote control device exclusive to a control target apparatus.

DESCRIPTION OF THE PREFERRED EMBODIMENTS

Figure 1:
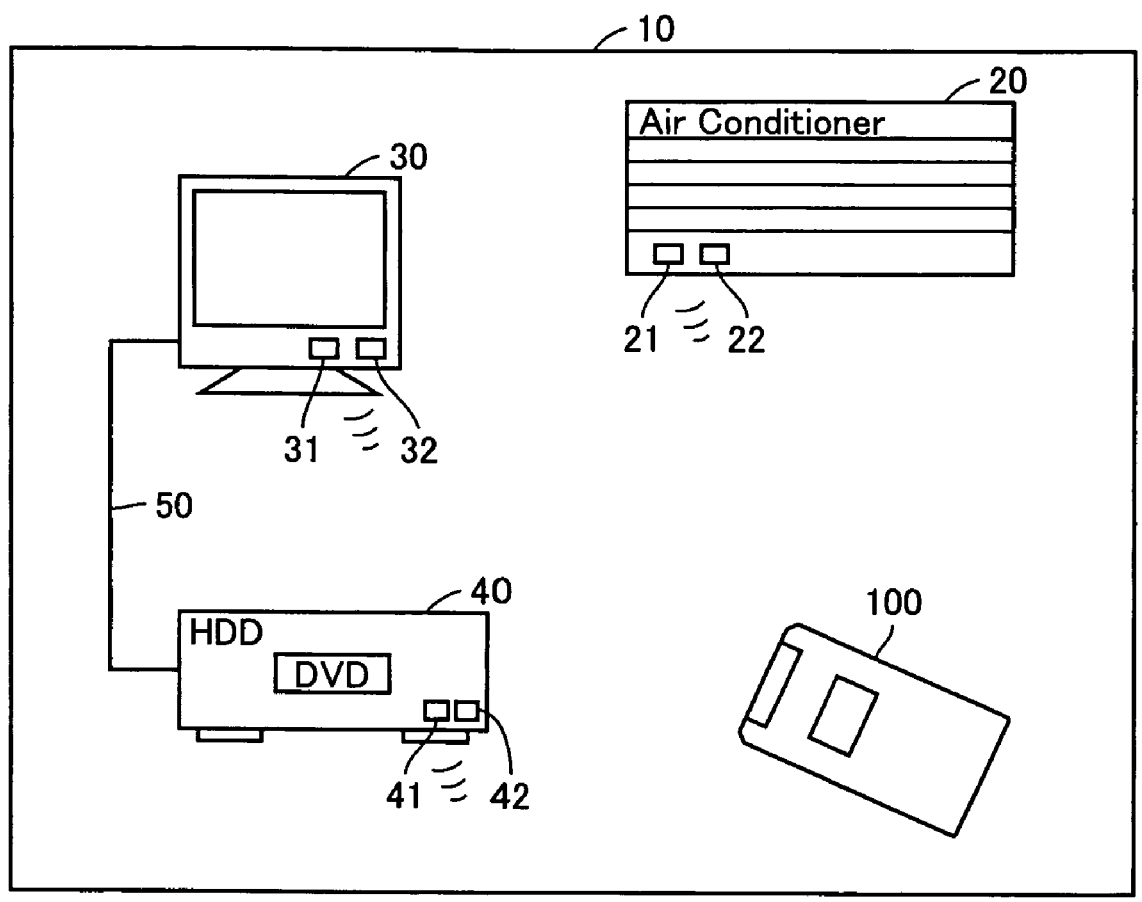
FIG. 1 represents a room in which apparatuses that can be controlled by a remote control device according to an embodiment of the present invention are placed.

Embodiments of the present invention will be described hereinafter with reference to the drawings. In the following description, the same elements have the same reference character allotted. Their designation and functions are also identical. Therefore, detailed description thereof will not be repeated.

First Embodiment

Referring to FIG. 1, a usage mode of a remote control device 100 according to an embodiment of the present invention will be described. FIG. 1 represents a room 10 in which apparatuses that can be controlled by remote control device 100 are placed.

An air conditioner 20, a television 30, and an HDD (hard disk drive) recorder 40 are placed in room 10. Air conditioner 20 includes a light emitting unit 21 emitting a signal including identification information of the air conditioner itself, and a light receiving unit 22 receiving a control signal emitted from remote control device 100. Television 30 includes a light emitting unit 31 emitting a signal including identification information of the television itself, and a light receiving unit 32 receiving a control signal emitted from remote control device 100. Connection between television 30 and HDD recorder 40 is established by a cable 50. HDD recorder 40 includes a light emitting unit 41 emitting a signal including identification information of the HDD recorder itself, and a light receiving unit 42 receiving a control signal emitted from remote control device 100.

Figure 2:
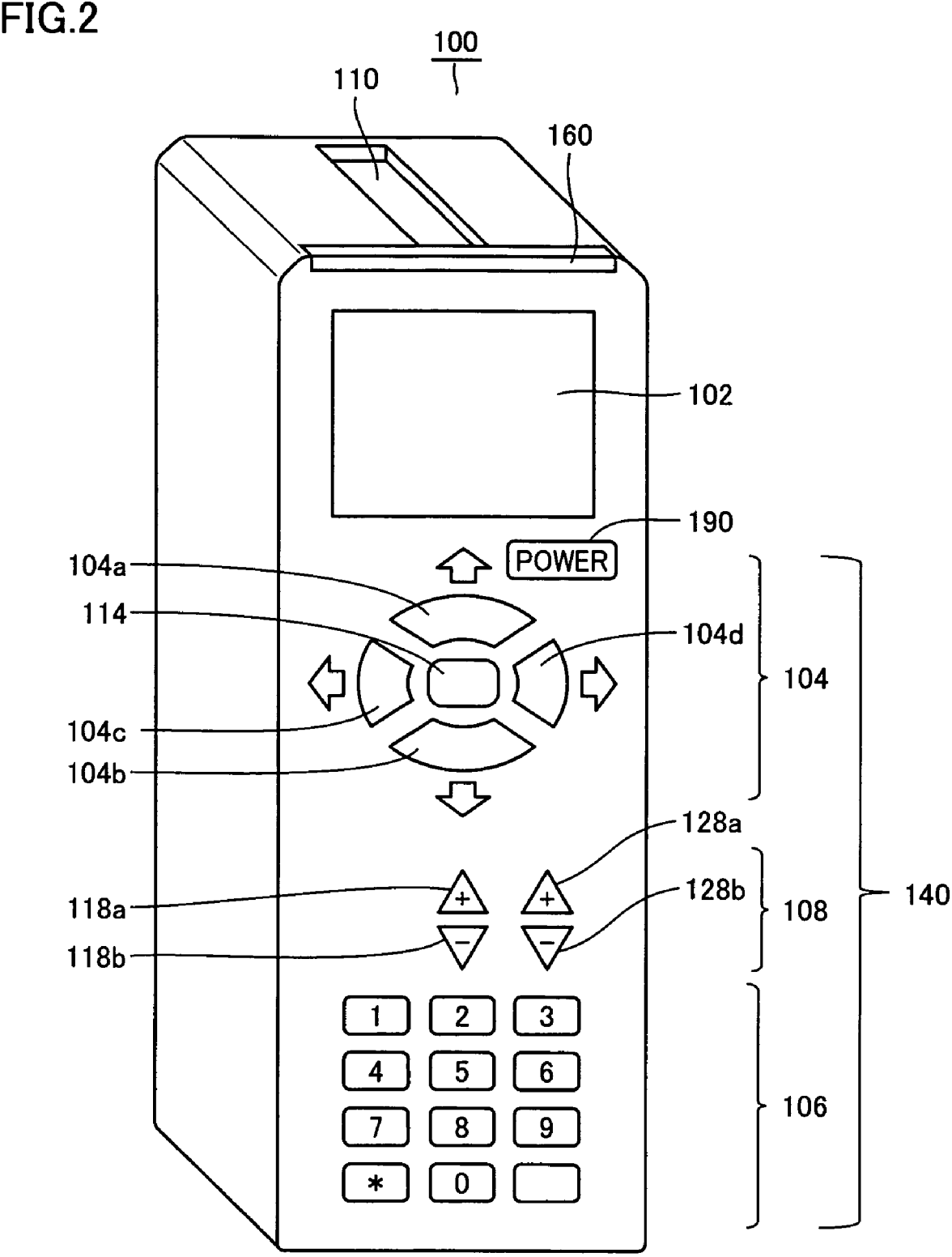
FIG. 2 represents an appearance of a remote control device according to an embodiment of the present invention.

A configuration of remote control device 100 of the first embodiment will be described hereinafter with reference to FIG. 2 representing an appearance of remote control device 100.

Remote control device 100 includes an external slit portion 110 through which an optical signal passes, a light emitting unit 160 emitting a control signal towards a control target apparatus, a display 102, an operation unit 140 receiving an input of an externally applied instruction to output a signal according to the input, and a power switch 190 receiving an input of a power on instruction.

Operation unit 140 is realized by, for example, buttons and/or a dial. Operation unit 140 includes cursor buttons 104a, 104b, 104c, and 104d defining the up/down and right/left directions of the cursor appearing on display 102, a determination button 114 receiving an input of an instruction to determine data input by the user of remote control device 100, an up/down button 108 to increment or decrement a value of the output control signal, and a numeric button 106. Up/down button 108 includes a first up button 118a, a first down button 118b, a second up button 128a, and a second down button 128b.

Power switch 190 accepts an input of an instruction to switch between ON and OFF of the power of a certain apparatus when remote control device 100 functions as a remote control device to control the apparatus.

Figure 3:
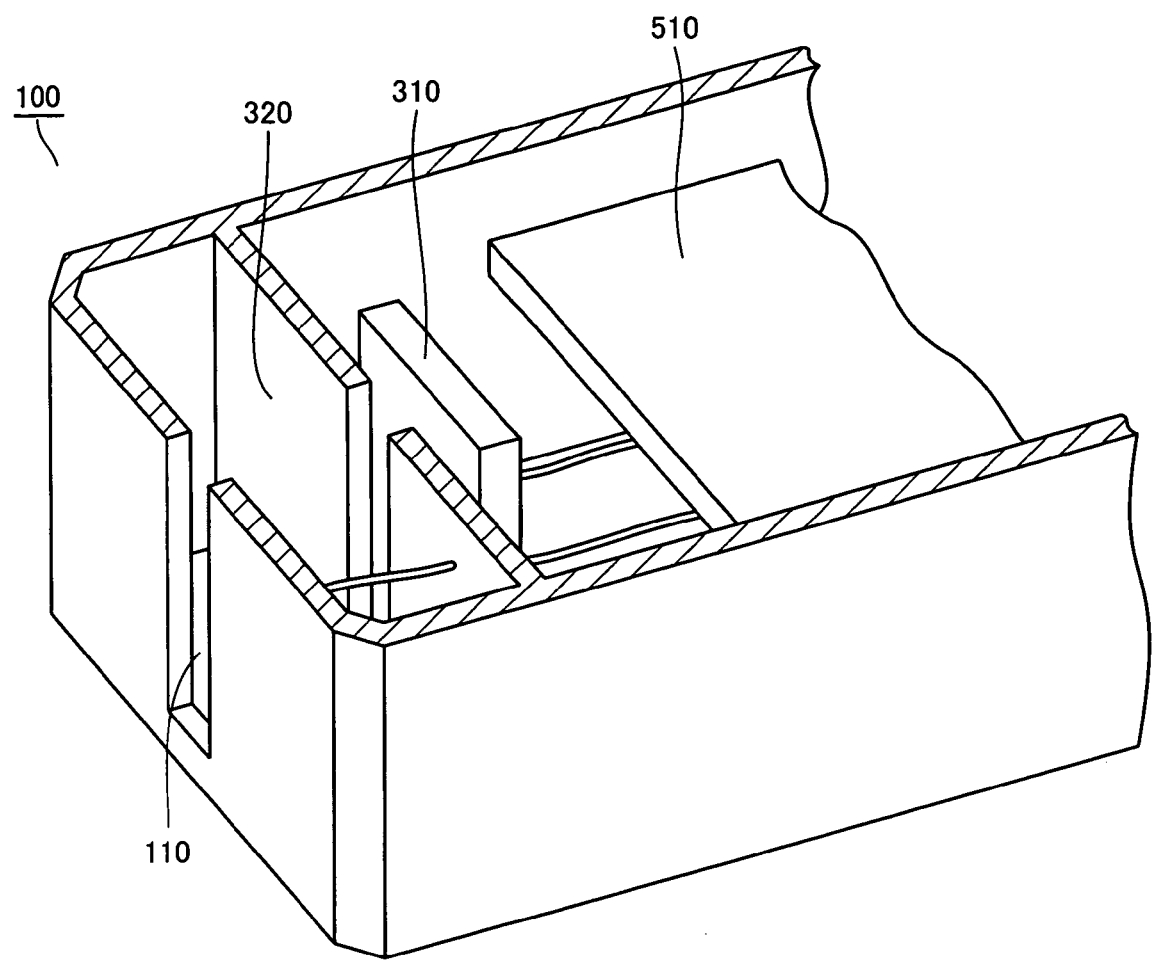
FIG. 3 schematically shows an internal configuration of a remote control device according to an embodiment of the present invention.

A configuration of remote control device 100 according to the present embodiment will be described in further detail with reference to FIG. 3 schematically showing an internal configuration of remote control device 100. Remote control device 100 includes, in addition to external slit portion 110, an internal slit portion 320, a light receiving element 310, and a control circuit 510. External and internal slit portions 110 and 320 are arranged such that the prolonged line of each opening crosses the receiving region of light receiving element 310. Light receiving element 310 is connected to control circuit 510 via a signal line.

External slit portion 110 is formed to be located vertically when remote control device 100 is operated. Similarly, internal slit portion 320 is formed so that the longitudinal direction of the opening is located vertically when remote control device 100 is operated. As used herein, "vertically" (the vertical direction) implies the perpendicular direction. In other words, the vertical direction is relative to the lateral direction corresponding to the direction connecting the left and right eyes of the user of remote control device 100.

Although light emitting unit 160 is provided at a site different from external slit portion 110, internal slit portion 320 and light receiving element 310 in the present embodiment, light emitting unit 160 may also share external slit portion 110 and internal slit 320 portion. For example, light emitting unit 160 may be provided upper of or lower of light receiving element 310. Since such a configuration allows the directivity of a control signal emitted from light emitting unit 160 to be restricted, the user can emit a control signal accurately towards the apparatus that is to be controlled even if a plurality of apparatuses are located nearby.

Figure 4:
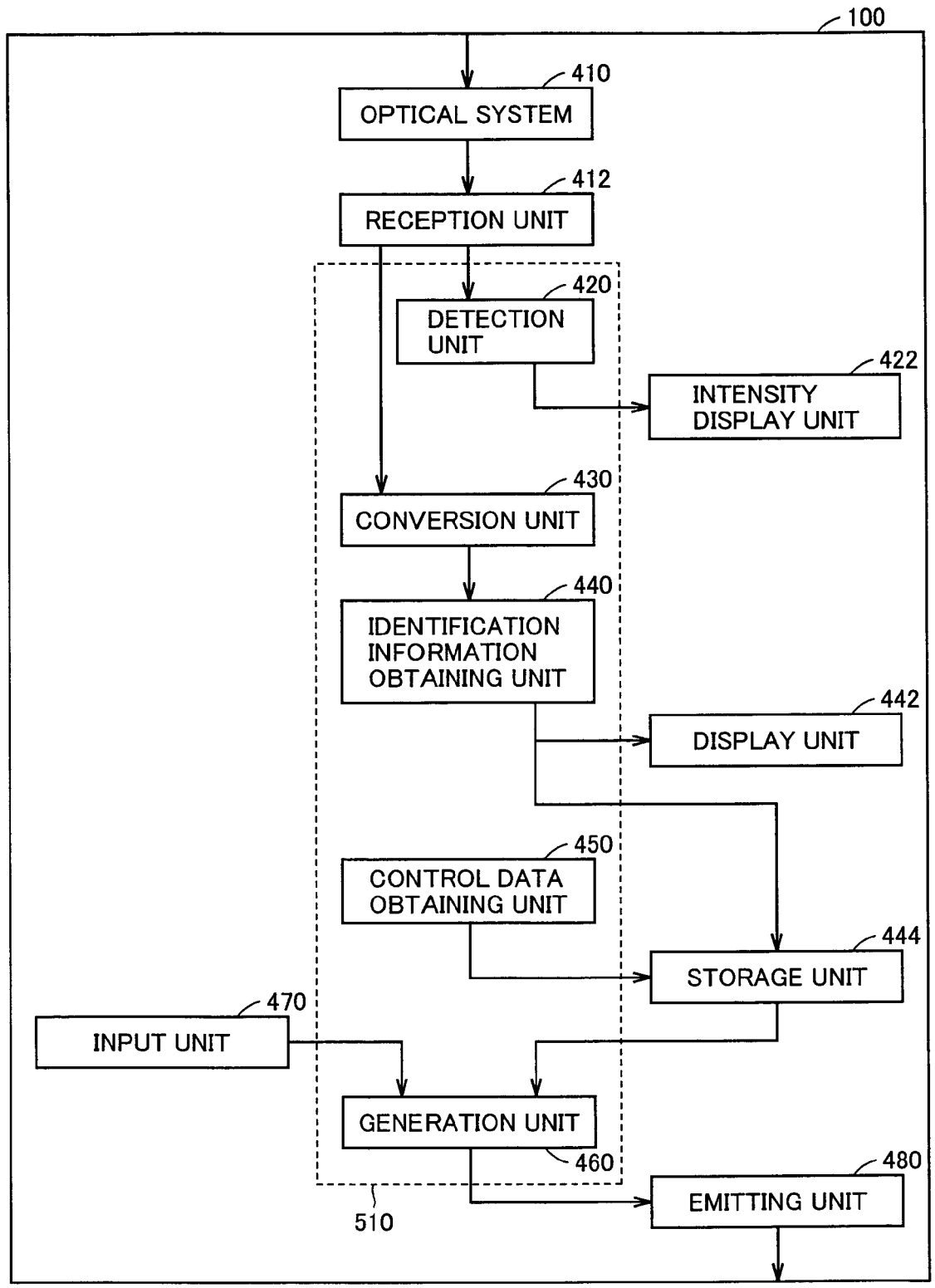
FIG. 4 is a block diagram of a functional configuration of a remote control device according to an embodiment of the present invention.

With reference to FIG. 4, the function realized by remote control device 100 will be described hereinafter. FIG. 4 is a block diagram representing the main functions of remote control device 100. Remote control device 100 includes an optical system 410, a light receiving unit 412, a detection unit 420, an intensity display unit 422, a conversion unit 430, an identification information obtaining unit 440, a display unit 442, a storage unit 444, a control data obtaining unit 450, a generation unit 460, an input unit 470, and an emitting unit 480.

Optical system 410 is provided at the casing of remote control device 100, and accepts an optical signal with incoming restricted in the lateral direction. Light receiving unit 412 receives an optical signal via optical system 410. Detection unit 420 detects the intensity of an optical signal received by light receiving unit 412.

Intensity display unit 422 displays the intensity of an optical signal detected by detection unit 420. Preferably, intensity display unit 422 includes a light emitting unit that emits a color corresponding to the intensity of the optical signal. Intensity display unit 422 may include a light emitting unit emitting light of a preset color, and an intensity control unit controlling the intensity of light emitted by the light emitting unit based on the intensity of the optical signal. The manner of notifying the intensity of an optical signal can be realized by means other than intensity display unit 422. For example, remote control device 100 may include an audio signal generation unit generating an audio signal corresponding to the intensity of an optical signal and an audio output unit to output audio based on the audio signal, instead of intensity display unit 422.

Conversion unit 430 converts an optical signal received by light receiving unit 412 into an electrical signal. Identification information obtaining unit 440 obtains identification information from the relevant electrical signal. This identification information is included in the optical signal received by remote control device 100. Display unit 442 displays the designation of the apparatus that has emitted the optical signal based on the identification information obtained by identification information obtaining unit 440. Display unit 442 is realized by, for example, a liquid crystal display, organic EL (Electro Luminescence), or the like. Intensity display unit 422 may be realized by the same hardware as display unit 442. Alternatively, intensity display unit 422 may be realized by another hardware. For example, a dedicated LED (Light Emitting Diode) may be employed.

Control data obtaining unit 450 accepts input of control data to control the relevant apparatus. Control data obtaining unit 450 obtains control data from an external source via, for example, a detachable data recording medium (not shown) or a data communication interface. Alternatively, control data obtaining unit 450 may obtain the relevant control data from an optical signal received by optical system 410 and a reception unit 412 in the case where control data is included in the optical signal.

Storage unit 444 stores the identification information obtained by identification information obtaining unit 440 and the control data obtained by control data obtaining unit 450. The identification information and control data are stored in association with each other for each apparatus in storage unit 444. The data configuration will be described afterwards.

Input unit 470 accepts an input of an instruction for remote control device 100. Input unit 470 is realized by, for example, a numeric button 106 and other buttons shown in FIG. 2. Generation unit 460 generates an optical control signal to control an appropriate apparatus based on the instruction input accepted by input unit 470 and control data stored in storage unit 444.

Emitting unit 480 is provided in the neighborhood of optical system 410, when realized as specific hardware, and emits an optical control signal generated by generation unit 460. Preferably, emitting unit 480 transmits an optical control signal with outgoing restricted in the lateral direction. Emitting unit 480 emits a near infrared signal, for example. Alternatively, emitting unit 480 may be configured to allow transmission of a signal having a configuration for radio communication such as a packet signal.

Figure 5:
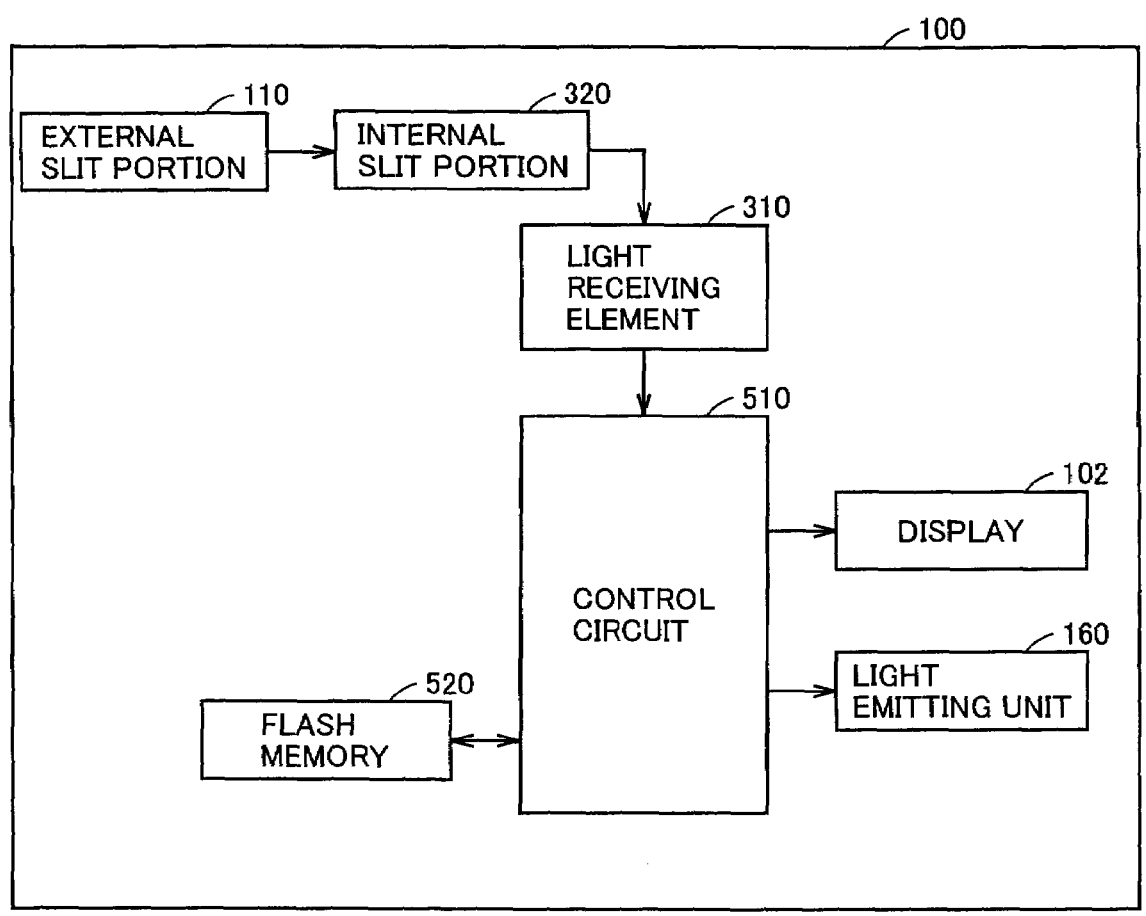
FIG. 5 is a block diagram of a hardware configuration of a remote control device according to an embodiment of the present invention.

Detection unit 420, conversion unit 430, identification information obtaining unit 440, control data obtaining unit 450, and generation unit 460 shown in FIG. 4 can be realized by hardware such as a control circuit 510 shown in FIG. 5. Alternatively, respective functions thereof may be realized by cooperation of software and hardware causing a processing unit to execute the process executed by detection unit 420, conversion unit 430, identification information obtaining unit 440, control data obtaining unit 450, and generation unit 460.

With reference to FIG. 5, a specific configuration of remote control device 100 will be described hereinafter. FIG. 5 is a block diagram representing a hardware configuration. Remote control device 100 includes, as its main structural elements, a control circuit 510 executing a predetermined process based on an externally applied instruction or an electrical signal output from light receiving element 310, and a data writable and readable flash memory 520, in addition to the configuration described above with reference to FIGS. 2 and 3.

External slit portion 110 and internal slit portion 320 are realized by, for example, molded resin. External and internal slit portions 110 and 320 may be formed integrally as one piece, or molded as separate pieces. Although the positional relationship between external slit portion 110 and internal slit portion 320 is fixed when molded in one piece, they may not necessarily have to be fixed. For example, the position of external slit portion 110 can be fine-adjusted. Accordingly, the light receiving property of an optical signal can be adjusted even after remote control device 100 is assembled.

Light receiving element 310 is realized by, but not limited to, a junction type light receiving element such as a pn type photodiode, phototransistor, and the like. The electrical signal output from light receiving element 310 is applied to control circuit 510. Control circuit 510 executes predetermined image processing on the signal to obtain information included in the optical signal received at remote control device 100. Operation unit 140 outputs an electrical signal corresponding to the input instruction to control circuit 510. Control circuit 510 executes a predetermined process according to the electrical signal.

Flash memory 520 receives and stores at a predetermined region a data input to identify the function of a control target apparatus from control circuit 510. Flash memory 520 stores data prepared in advance. The data includes control data to cause a control target apparatus under control of remote control device 100 to execute a predetermined operation.

Control circuit 510 generates a signal to execute a predetermined process based on the relevant control data when remote control device 100 functions as a remote control device for a certain control target apparatus. Control circuit 510 provides the generated signal to light emitting unit 160.

Although control circuit 510 is realized by control elements configured in advance to execute various processing, the function realized by control circuit 510 may be realized in another manner. For example, the function can be realized by cooperation of software and hardware causing a CPU (Central Processing Unit) and/or another processor to execute a program directed to executing various processing.

Light emitting unit 160 emits a control signal from control circuit 510 to an external source. Light emitting unit 160 emits an infrared signal, for example. According to another aspect, a transmission unit to transmit a control signal as a packet, connected to a communication line, for example, may be used instead of light emitting unit 160.

The connecting relationship between the hardware configuration and various structural constituent elements of remote control device 100 is not limited to that shown in FIG. 5. A slit such as those of external slit portion 110 and internal slit portion 320 may be provided on the path of the signal output from light emitting unit 160. Alternatively, external and internal slit portions 110 and 320 may be shared by both light receiving element 310 and light emitting unit 160. Accordingly, remote control device 100 can emit a control signal having the lateral spread suppressed.

Figure 6:
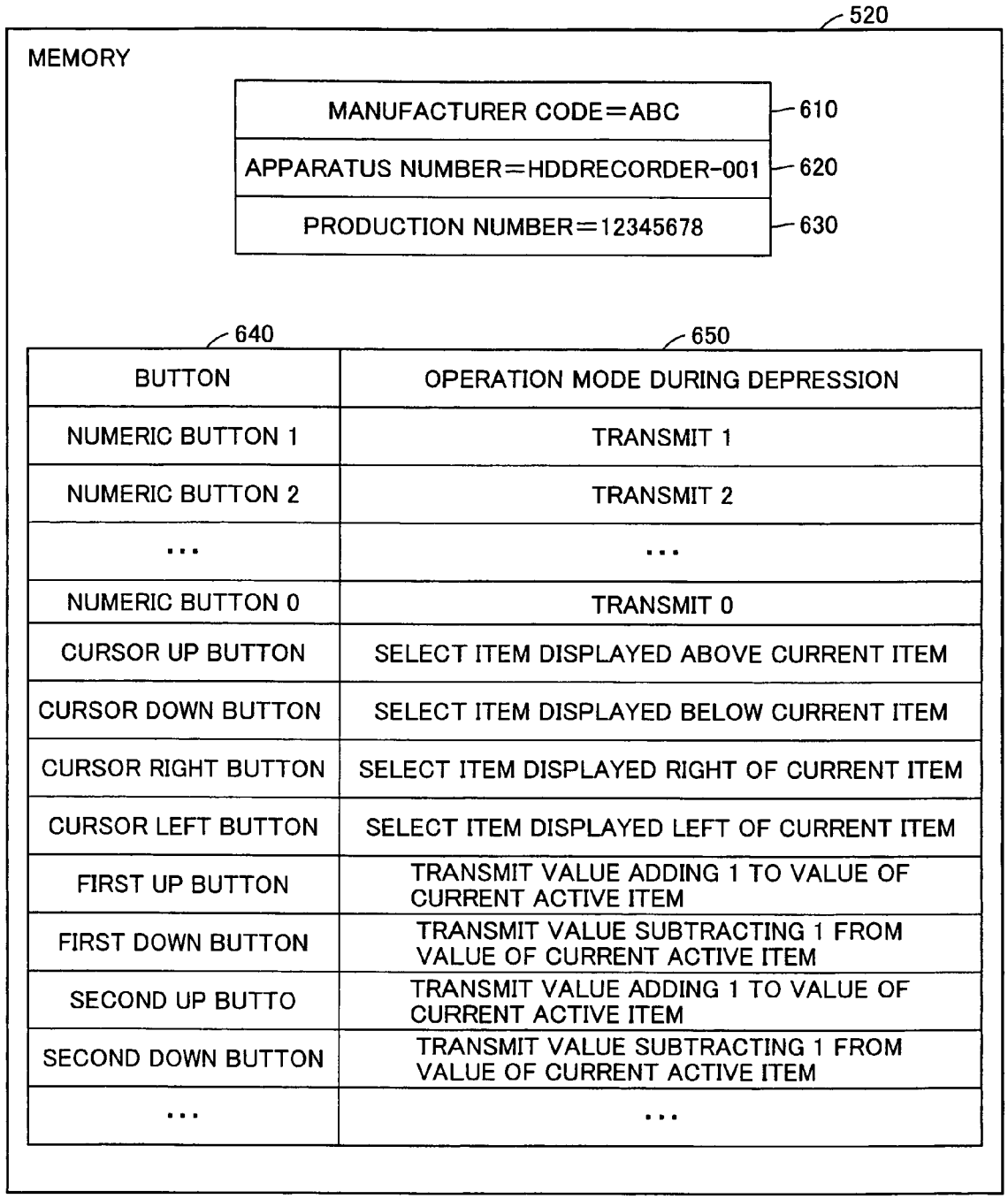
FIG. 6 schematically represents a manner of data storage in a flash memory of a remote control device according to an embodiment of the present invention.

With reference to FIG. 6, the data configuration in remote control device 100 will be described hereinafter. FIG. 6 schematically shows a manner of data storage in flash memory 520 of remote control device 100. Such data is stored in flash memory 520 after HDD recorder 40 is authenticated by remote control device 100.

Flash memory 520 includes regions 610-650 for data storage. A manufacturer code "ABC" of HDD recorder 40 is stored in region 610. The apparatus number "HDD RECORDER-001" of HDD recorder 40 is stored in region 620. The production number "12345678" of HDD recorder 40 is stored in region 630.

Information to identify each of the buttons provided at operation unit 140 of remote control device 100 is stored in region 640. The operation mode when the relevant button is depressed is stored in region 650 in association with each button. For example, numeric button "1" is set to transmit data "1", when depressed. The cursor up button is set to execute a process in order to select the item displayed above the currently displayed item at display 102, when depressed. Further, "first up button" is set to allow transmission of a value having "1" added to the value of the current active item (i.e., controllable item) when first up button 108a is depressed. For example, when first up button 108a is functioning as a button to select a channel, depression of first up button 108a causes transmission of a signal including a channel number corresponding to the current channel number incremented by 1.

Since the data stored in region 640 is set in association with the data stored in region 650 as set forth above, remote control device 100 can emit a signal for execution of an operation corresponding to a control target apparatus according to the depression of respective buttons.

Figure 7:
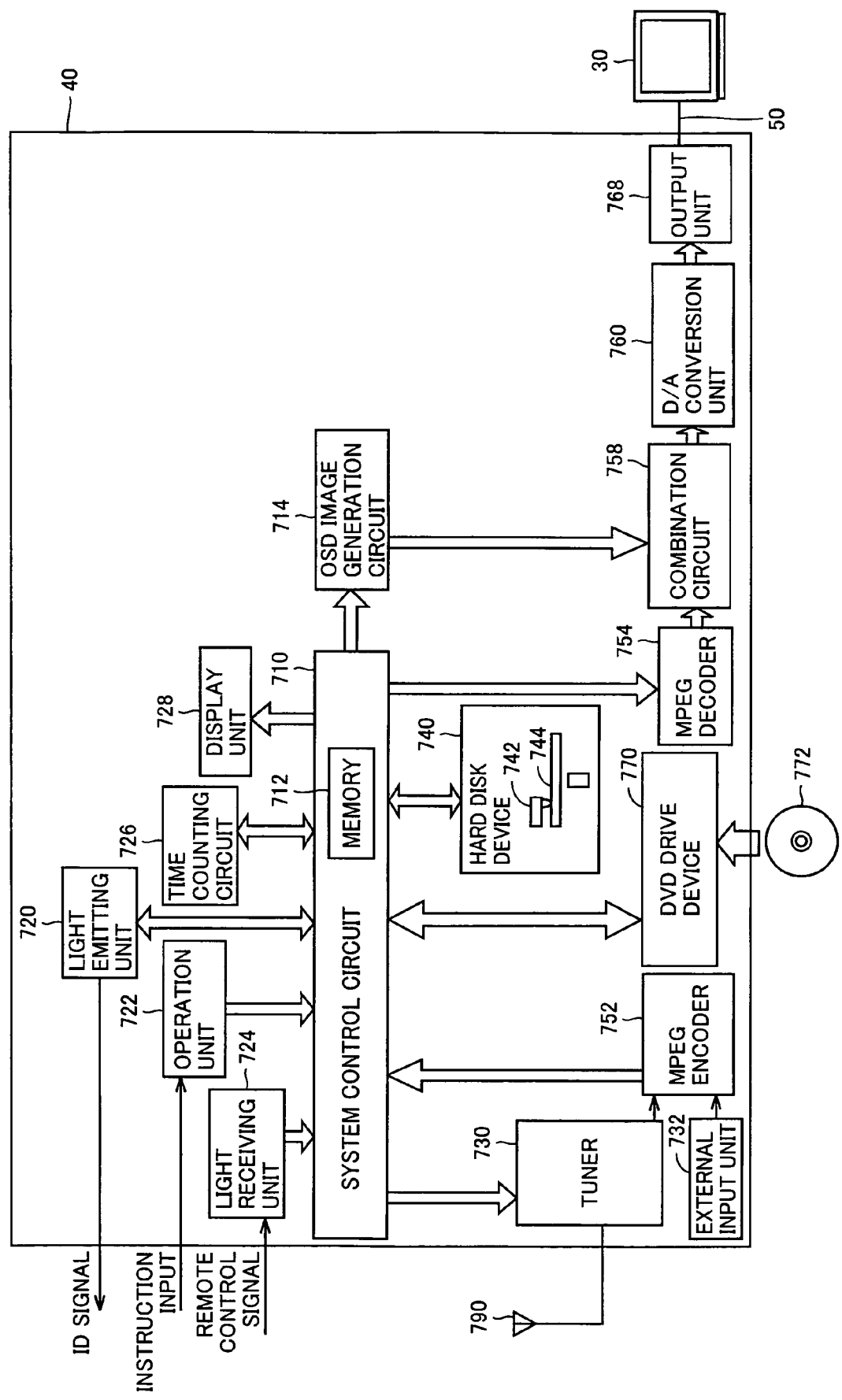
FIG. 7 is a block diagram of a hardware configuration of an HDD recorder.

With reference to FIG. 7, HDD recorder 40 according to an embodiment of the present invention will be described hereinafter. FIG. 7 is a block diagram representing a hardware configuration. HDD recorder 40 is connected to television 30 via cable 50.

HDD recorder 40 includes a light receiving unit 724 receiving an externally applied remote control signal, an operation unit 722 receiving an input of an instruction, and a light emitting unit 720 emitting infrared light including information to identify HDD recorder 40 to an external source. Light emitting unit 720 emits infrared light for a predetermined period of time when, for example, the power of HDD recorder 40 is ON. When a transmission request of such infrared light is received, HDD recorder 40 may emit infrared light in response to the request.

HDD recorder 40 is connected to an antenna 790. HDD recorder 40 includes a tuner 730 obtaining a signal of a selected channel based on a video signal received through antenna 790, an external input unit 732 accepting an externally applied video audio signal, a system control circuit 710 executing a process to control the operation of HDD recorder 70, and an MPEG (Moving Picture Experts Group) encoder 752 receiving an input of video signals from tuner 730 and external input unit 732 to executing a predetermined compression coding process thereon to generate digital data.

HDD recorder 40 further includes a DVD (digital versatile disc) drive device 770, a hard disk device 740, an MPEG decoder 754 to decode digital data, an OSD (On Screen Display) image generation circuit 714 to generate an image to be displayed at the display region of the image display device connected to HDD recorder 40, a combination circuit 758 combining signals from MPEG decoder 754 and OSD image generation circuit 714 for output, an D/A (Digital to Analog) conversion unit 760 to convert a digital signal into an analog signal, and an output unit 768 to output an analog video audio signal to an external source.

DVD drive device 770 has a DVD 772 loaded. Hard disk device 740 includes a hard disk 744 to record disk digital information, and a pick up 742 to store/read out data into/from hard disk 744.

The operation executed by DVD drive device 70 and hard disk device 740 are well known in the field of art. Therefore, detailed description thereof will not be repeated here.

Figure 8:
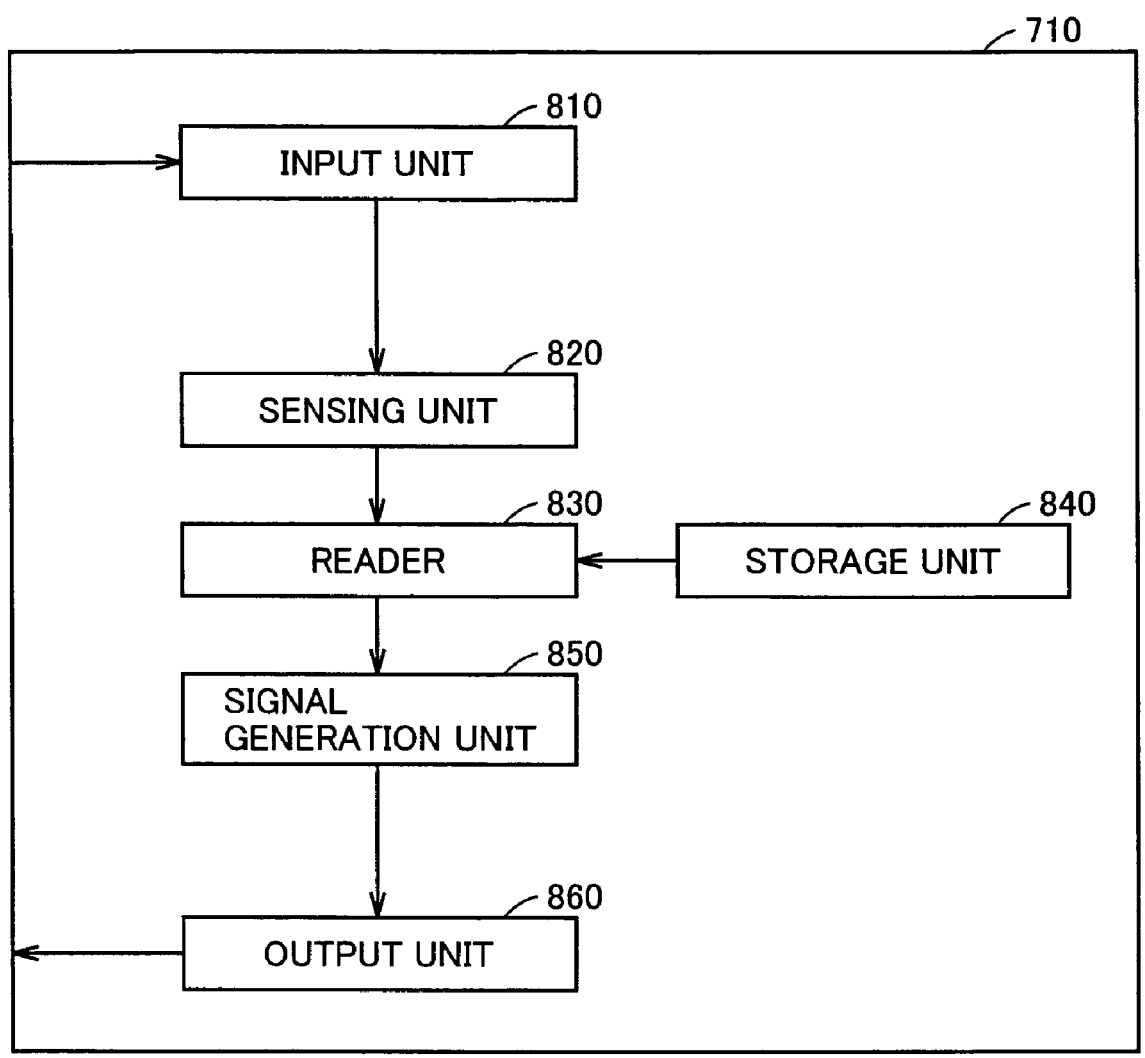
FIG. 8 is a block diagram of a functional configuration of a system control circuit of an HDD recorder.

With reference to FIG. 8, system control circuit 710 realizing HDD recorder 40 will be described. FIG. 8 is a block diagram representing the functional configuration of system control circuit 710.

System control circuit 710 includes an input unit 810 receiving an externally applied signal, a sensing unit 820 sensing a transmission request of information to identify HDD recorder 40 based on the externally applied signal, a reader 830 reading out information from storage unit 840 in which identification information is stored according to a sensed request, a signal generation unit 850 generating a transmission signal based on the identification information read out by reader 830, and an output unit 860 to output the signal generated by signal generation unit 850. Output unit 860 outputs a signal for transmission towards light emitting unit 720. Light emitting unit 720 emits that signal in form of an infrared signal in a predetermined direction.

Figure 9:
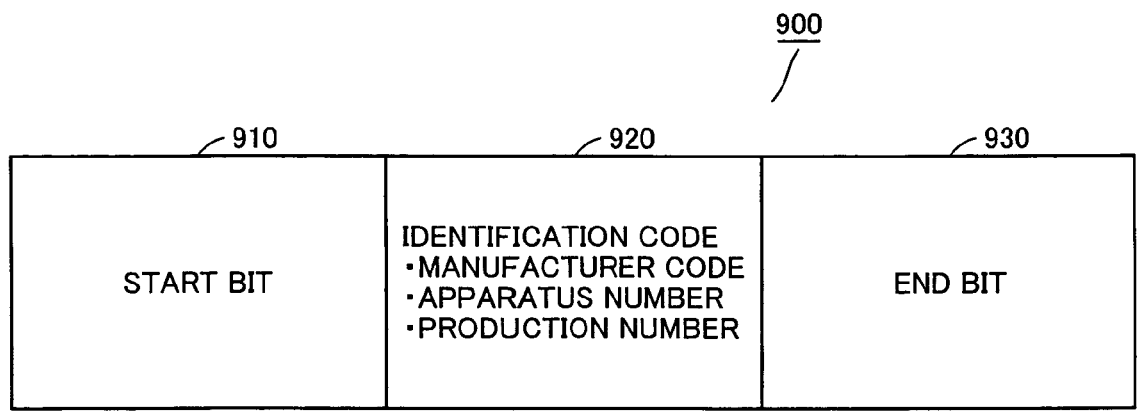
FIG. 9 is a block diagram of an exemplary configuration of an optical signal transmitted from a control target apparatus to a remote control device.

With reference to FIG. 9, the signal emitted from HDD recorder 40, television 30, air conditioner 20, and/or another control target apparatus will be described hereinafter. FIG. 9 is a block diagram representing an example of a configuration of an optical signal 900 transmitted from a control target apparatus towards remote control device 100.

Optical signal 900 includes a start bit 910, an identification bit 920, and an end bit 930. Start bit 910 includes data to identify the beginning of an optical signal sequentially transmitted. Identification data 920 includes information of a control target apparatus such as the manufacturer code, apparatus number, production number and the like, i.e. information to identify an apparatus. End bit 930 includes data to identify the end of a sequentially transmitted optical signal.

Figure 10:
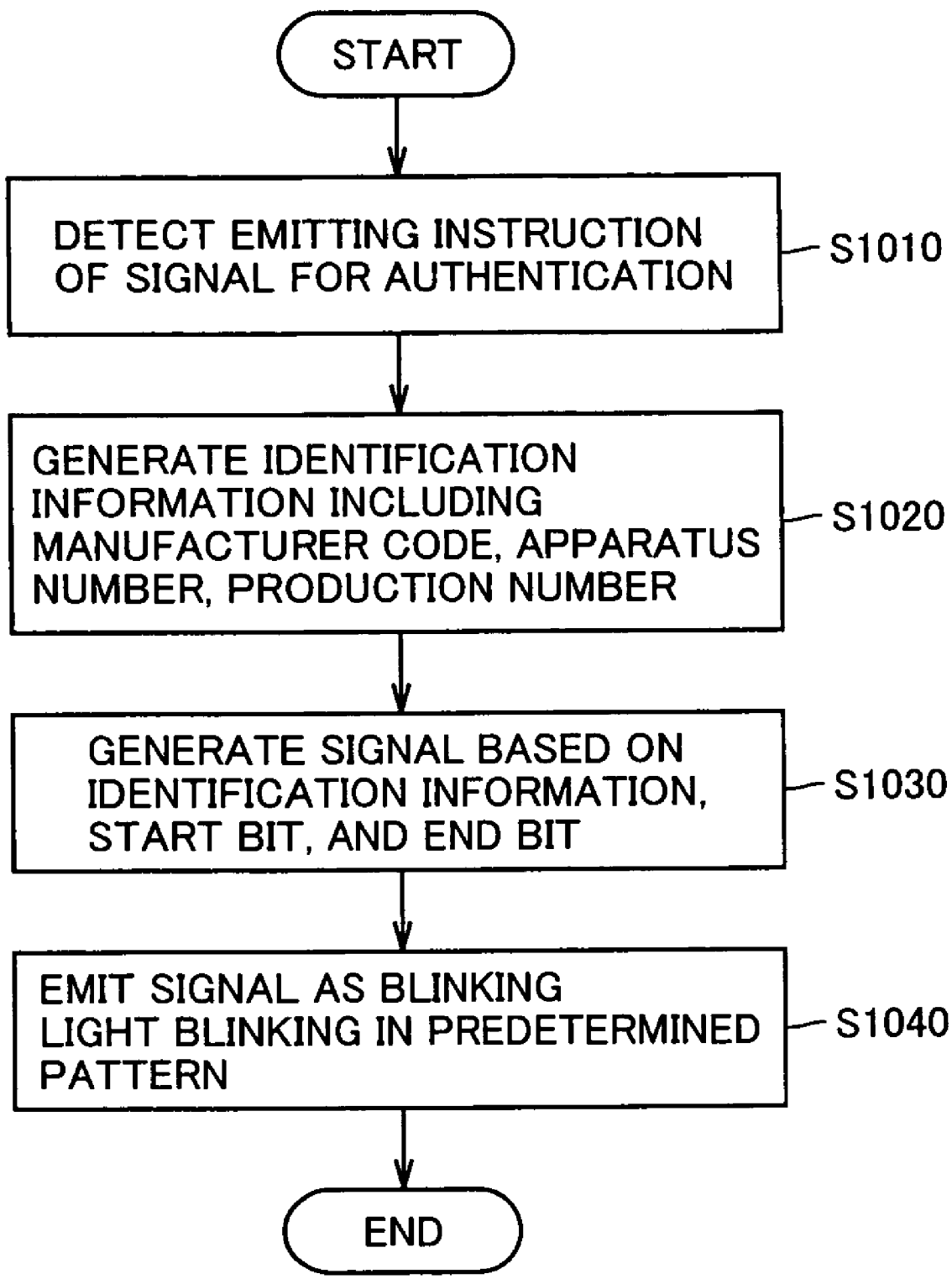
FIG. 10 is a flowchart of procedures executed by a system control circuit to transmit identification information of an HDD recorder.

With reference to FIG. 10, a control configuration of HDD recorder 40 will be described hereinafter. FIG. 10 is a flowchart representing procedures executed by system control circuit 710 to transmit the identification information of HDD recorder 40.

At step S1010, system control circuit 710 of HDD recorder 40 detects an instruction to emit a signal to authenticate an apparatus from the signal received by light receiving unit 724. At step S 1020, system control circuit 710 generates identification information including the manufacturer code, apparatus number, and production number of HDD recorder 40 based on the data stored in memory 712. At step S1030, system control circuit 710 generates a signal for transmission (FIG. 9) based on the identification information, start bit 910, and end bit 930.

At step S1040, system control circuit 710 causes light emitting unit 720 to emit a signal as blinking light that blinks in a predetermined pattern. As a result, an infrared signal including information to identify HDD recorder 40 is sequentially emitted from light emitting unit 720 towards a predetermined direction.

Figure 11:
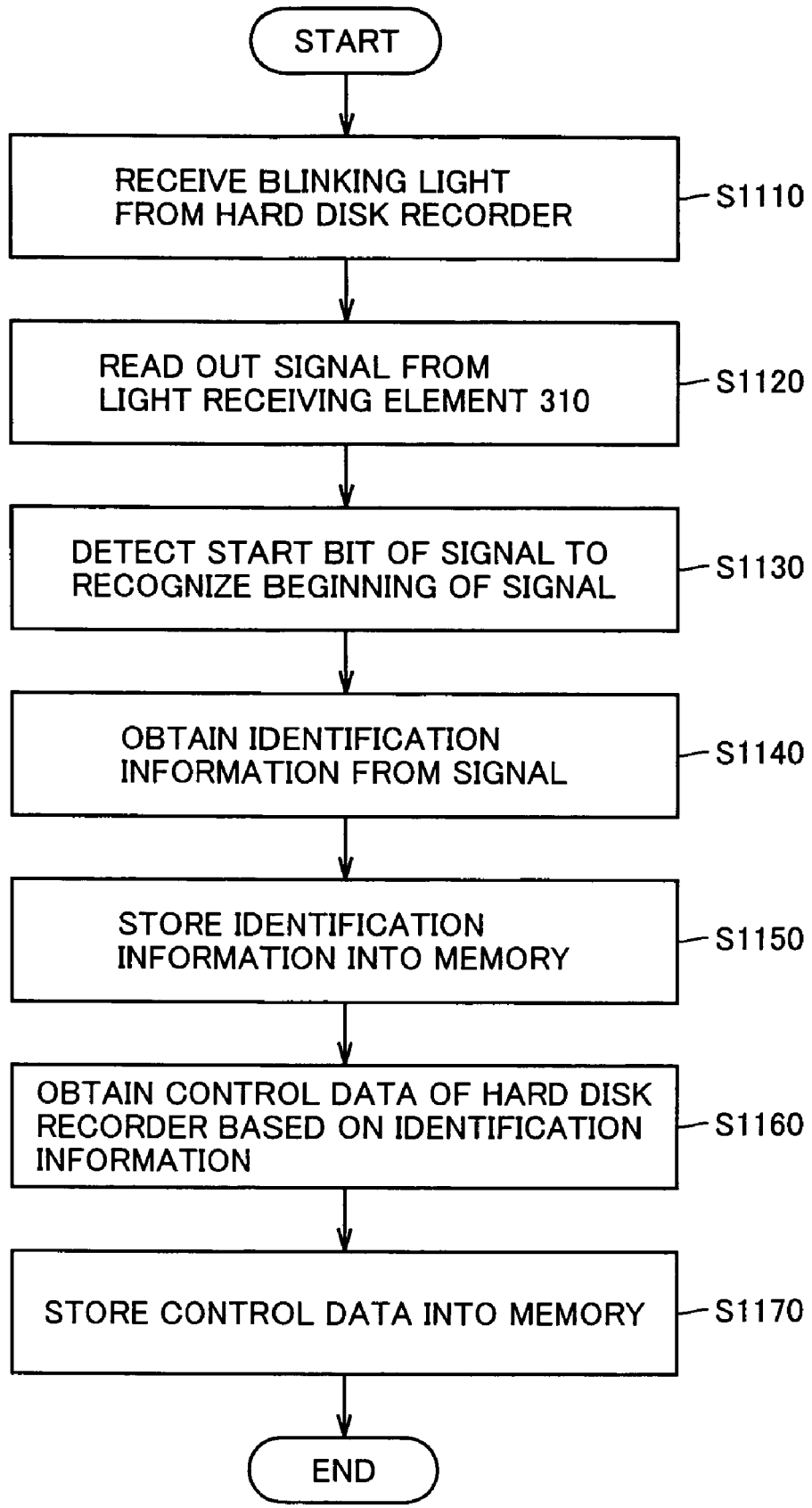
FIG. 11 is a flowchart of procedures executed by a control circuit to authenticate a control target apparatus.

With reference to FIG. 11, the control configuration of remote control device 100 according to the present embodiment will be described hereinafter. FIG. 11 is a flowchart representing procedures executed by control circuit 710 to authenticate a control target apparatus.

At step 1110, control circuit 710 receives blinking light emitted by HDD recorder 40. At step S1120, control circuit 710 reads out one unit of signal obtained at the center region of light receiving element 310. This one unit of signal refers to the aforementioned signal from a start bit to an end bit. At step S1130, control circuit 710 identifies the beginning of the signal by detecting start bit 910 thereof. At step S1140, control circuit 710 obtains identification information (for example, identification data 920) of HDD recorder 40 from that signal. At step S1150, control circuit 710 stores the obtained identification information in a predetermined region in flash memory 520.

At step S1160, control circuit 710 obtains control data of HDD recorder 40 based on the identification information. As used herein, control data refers to data to instruct a function that can be executed by HDD recorder 40. At step S1170, control circuit 710 stores the obtained control data in a predetermined data region in flash memory 520.

Figure 12:
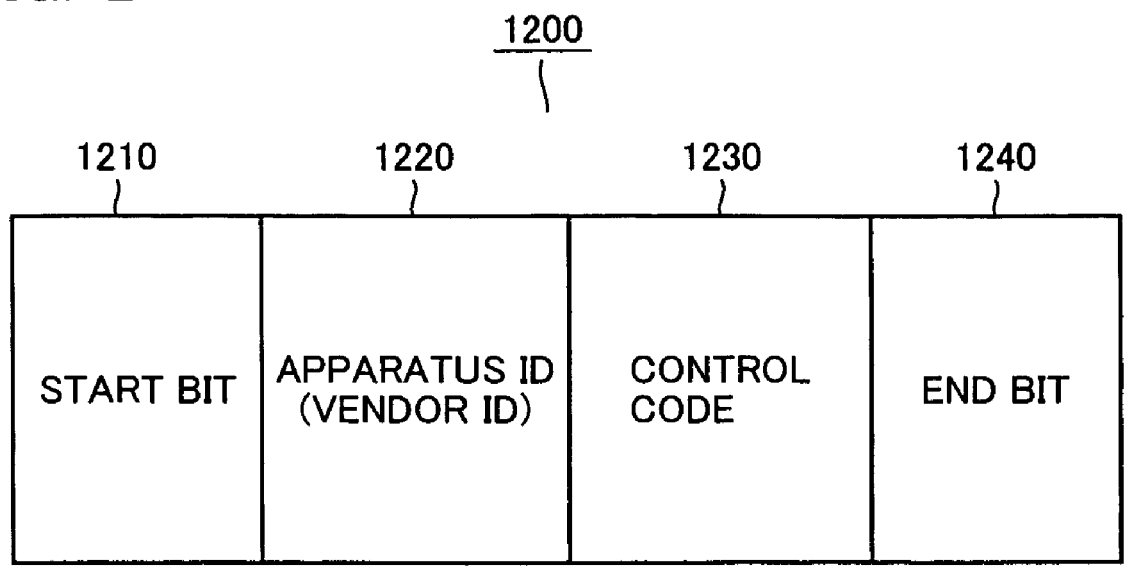
FIG. 12 schematically represents a configuration of an optical signal directed to controlling an apparatus.

With reference to FIG. 12, optical signal 1200 sent from remote control device 100 will be described hereinafter. With reference to FIG. 12 schematically shows a configuration of optical signal 1200 controlling an apparatus. Optical signal 1200 includes regions 1210-1240 where data is stored.

The start bit representing the beginning of optical signal 1200 is stored in region 1210. The apparatus ID (or vendor ID) to identify the apparatus under control of remote control device 100 is stored in region 1200. The predefined control code to control an operation of the relevant apparatus is stored in region 1230. The end bit indicating the end of optical signal 1200 is stored in region 1240.

Figure 13:
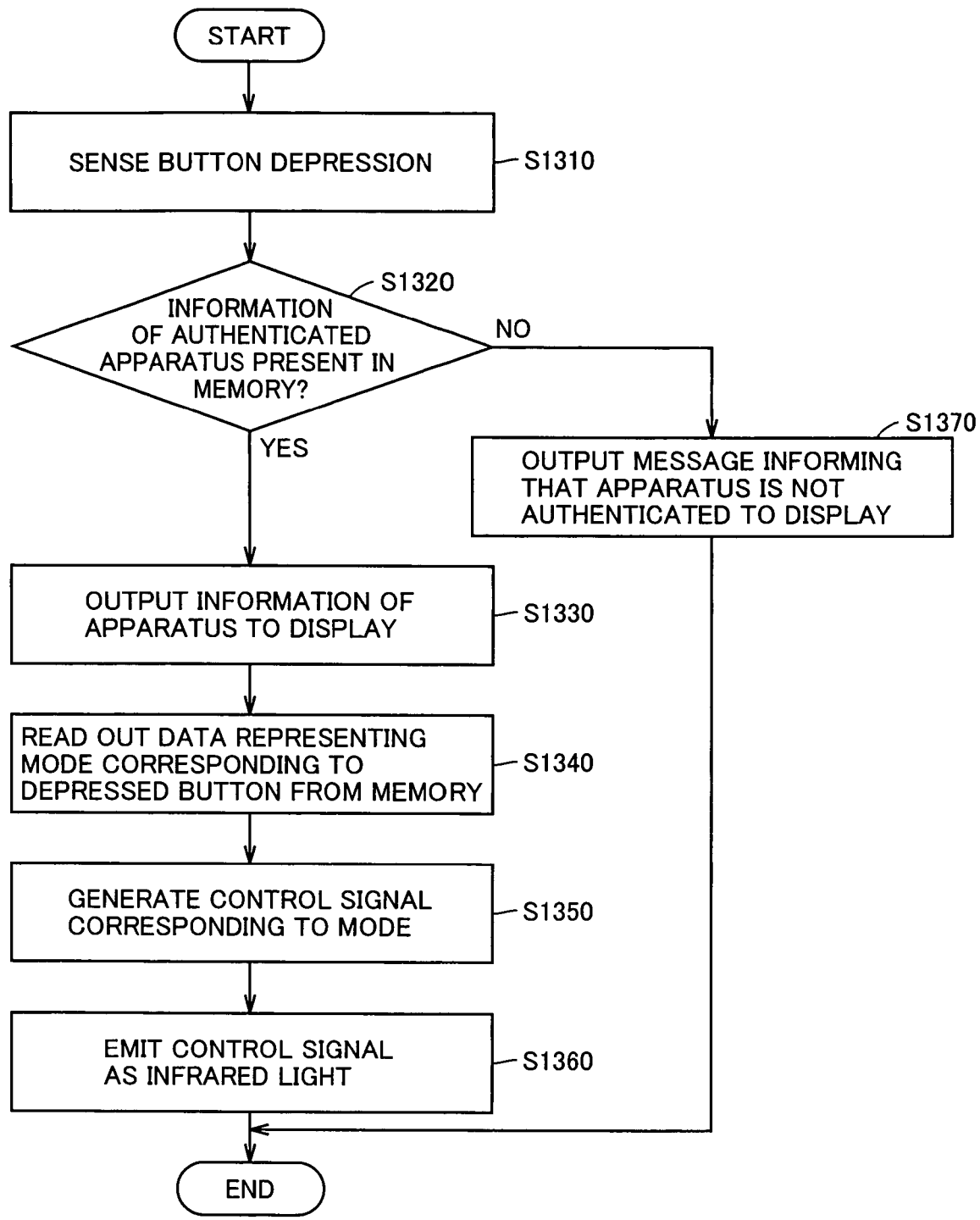
FIG. 13 is a flowchart of procedures executed by a remote control device to control a control target apparatus.

With reference to FIG. 13, the control configuration of remote control device 100 will be described again. FIG. 13 is a flowchart representing procedures executed by remote control device 100 to control a control target apparatus. The process is executed when the user sets remote control device 100 as a controller dedicated to a particular control target apparatus (for example, HDD recorder 40, television 30, air conditioner 20).

At step S1310, control circuit 710 senses depression of a button based on an input via operation unit 140. At step S1320, control circuit 710 determines whether information of an authenticated apparatus is stored in the memory or not based on a signal from operation unit 140. When control circuit 710 determines that the information is present in the memory (YES at step S1320), control proceeds to step S1330; otherwise (NO at S1320), control proceeds to step S1370.

At step S1330, control circuit 710 outputs the information of the authenticated apparatus to display unit 102. Display unit 102 provides a display of the information of the apparatus. The display manner will be described with reference to FIG. 14.

At step S1340, control circuit 710 reads out from flash memory 520 data representing a mode corresponding to the depressed button. At step S1350, control circuit 710 generates a control signal corresponding to the mode. At step S1360, control circuit 710 outputs the control signal in the form of infrared light via light emitting unit 160.

At step S1370, control circuit 710 outputs a message informing that there is no apparatus authenticated to display unit 102. Display unit 102 provides a display of that message on the display region.

A display manner of an image at display unit 102 will be described with reference to FIG. 14. Image (A) corresponds to the case where the control target apparatus is not authenticated by remote control device 100. Specifically, display unit 102 provides a display of a message indicating that authentication of the control target apparatus is not completed, and a message prompting to obtain information of the apparatus. This display is realized by prestoring relevant data in flash memory 520, and reading out the relevant data during execution of the process at step S1370 by control circuit 710. By such display, the user of remote control device 100 can immediately recognize that the authentication process is not completed. Accordingly, the user will obtain again a signal by directing remote control device 100 towards the control target apparatus. Thus, an authentication process can be realized reliably.

Image (B) corresponds to the case where a control apparatus is authenticated. In this case, remote control device 100 causes display unit 102 to provide a display of information of the apparatus based on the data stored in flash memory 520. In the example of image (B), manufacturer code "ABC", apparatus number "HDDRECORDER-001", and production number "12345678" are displayed corresponding to the apparatus that has been authenticated.

Remote control device 100 can function as a remote control device of another control target apparatus. A case where remote control device 100 functioning as a remote control device for HDD recorder 40 is to function as a remote control device for air conditioner 20 following the process of authenticating again the relevant control target apparatus will be described hereinafter.

Figure 15:
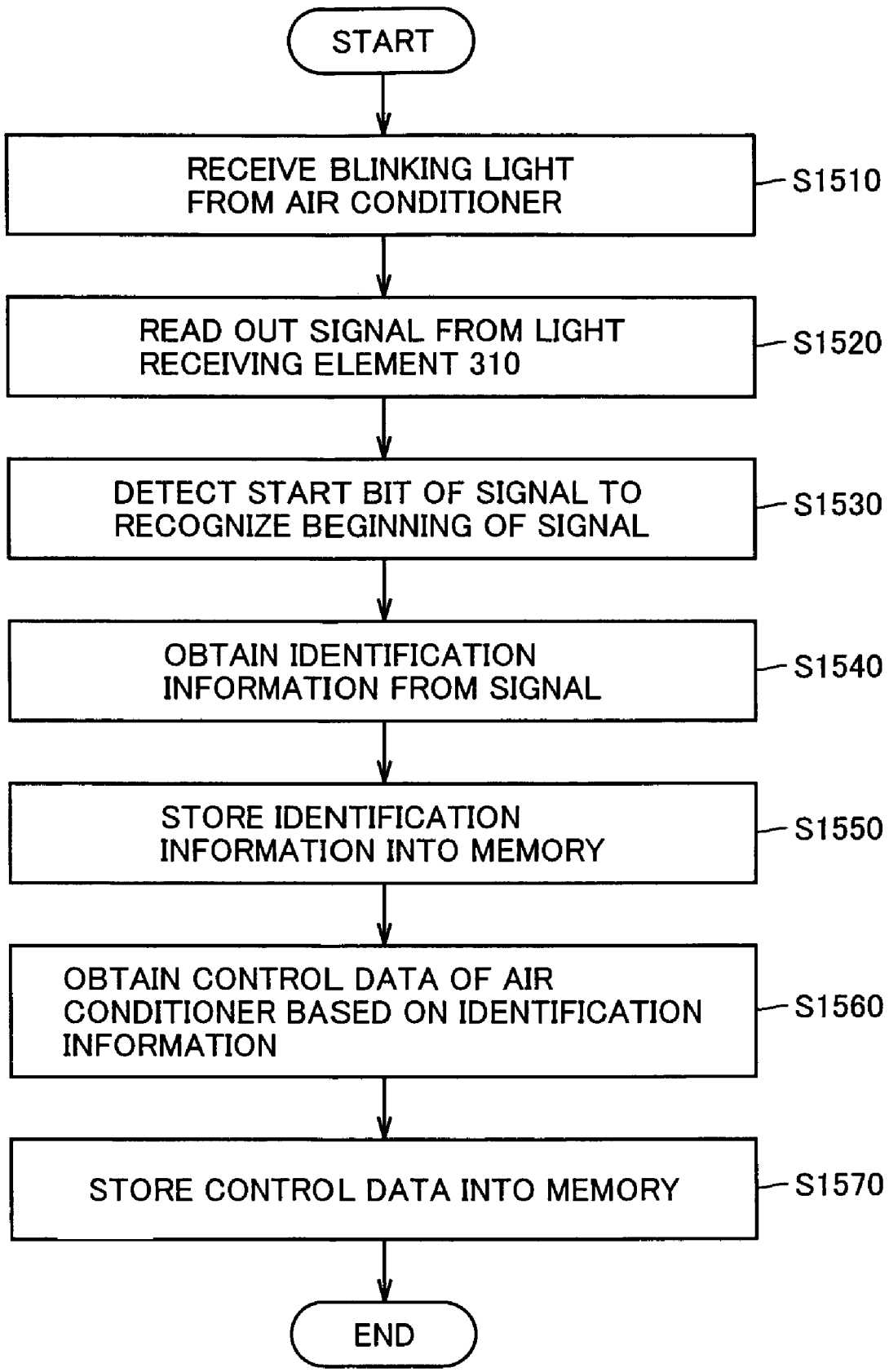
FIG. 15 is a flowchart of procedures executed for authentication of an air conditioner by a remote control device that has already authenticated a control target apparatus.

FIG. 15 is a flowchart representing procedures to execute authentication of air conditioner 20 by remote control device 100 that has already authenticated a control target apparatus. This process is realized in the case where the user of remote control device 100 executes a predetermined operation with remote control device 100 directed towards light emitting unit 21 of air conditioner 20.

At step S1510, light receiving element 310 receives the blinking light from air conditioner 20 incident via external slit portion 110 and internal slit portion 320. Light receiving element 310 converts the received optical signal into an electrical signal for transmission to control circuit 710. At step S1520, control circuit 710 obtains one unit of an optical signal from the blinking light received at light receiving element 310 based on the electrical signal. At step S1530, control circuit 710 detects start bit 910 of that signal to identify the beginning of the signal. At step S1540, control circuit 710 obtains identification data included in the signal. At step S1550, control circuit 710 stores the identification information (data representing air conditioner 20) in a data region of flash memory 520.

At step S1560, control circuit 710 obtains control data of air conditioner 20 based on the identification information of air conditioner 20. When the control target apparatus is air conditioner 20, the control items corresponding to the control data include, for example, air flow adjustment, temperature adjustment, selection of operation (fan, cooler, dehumidifier, heater), modification of temperature setting, modification of timer setting, and the like. The control items correspond to the operation executed by the relevant control target apparatus based on control data. Obtaining control data is realized by modifying the internal process such that relevant control data is rendered usable in the case where control data of air conditioner 20 is prestored in flash memory 520. Alternatively, in the case where remote control device 100 can be loaded with a detachable recording medium, control data can be obtained from the relevant recording medium. At step S1570, control circuit 710 sets the obtained control data in association with a control item for storage in flash memory 520. Thus, remote control device 100 functions as a remote control device to control air conditioner 20.

With reference to FIG. 16, the data structure of remote control device 100 will be described hereinafter. FIG. 16 represents data stored in flash memory 520 when remote control device 100 authenticates air conditioner 20 as the subject of control.

The manufacturer code (XYZ) of air conditioner 20 is stored in region 610. The apparatus number (AIR CONDITIONER 100) of air conditioner 20 is stored in region 620. The production number (01234567) is stored in region 630.

In flash memory 520, each of the buttons provided as operation unit 140 of remote control device 100 is set in correspondence with a relevant operation when depressed. For example, "cursor up button" (cursor button 104a in FIG. 2) is set to sequentially switch the operation mode in the order of fan, cooler, dehumidifier, and heater when that button is depressed.

The first up button (up button 118a in FIG. 2) is set to output a control signal to raise the set temperature of air conditioner 20 by 1° C., when depressed. Similarly, the second up button (up button 128a in FIG. 2) is set to output a control signal to increase the timer setting time of air conditioner 20 by 1 hour, when depressed.

The numeric button "1" to "0" is set to suppress output of a control signal, even when depressed. In this case, a signal representing that the signal output in response to depression of the relevant button is "invalid" is set in association. Accordingly, correspondence between depression of a relevant button and a particular operation is not established, so that a control signal will not be output when the button is depressed erroneously. Thus, an erroneous operation is prevented.

Although the data configuration of FIG. 16 represents the case where data is overwritten on the data configuration of FIG. 6, data does not necessarily have to be overwritten. Specifically, a new region can be provided when control data is newly obtained to store that data in the new region. In this case, data of a plurality of control target apparatuses is stored corresponding to the data region available in memory 520. Therefore, control data of the same control target apparatus does not have to be obtained every time. Therefore, the convenience of remote control device is improved.

With reference to FIG. 17, a display manner of an image at display unit 102 of remote control device 100 according to the present embodiment will be described hereinafter. FIG. 17 represents an image displayed on display unit 102 when remote control device 100 recognizes air conditioner 20.

When the user performs an operation to receive a signal by directing remote control device 100 towards air conditioner 20, remote control device 100 executes the authentication process set forth above (FIG. 15) to recognize air conditioner 20. When remote control device 100 obtains identification information included in the signal received from air conditioner 20, the information is written in flash memory 520. If another control target apparatus is already authenticated in this case, data of the newly authenticated apparatus is overwritten on the data, or written into a newly provided region.

Upon completion of the authentication process, remote control device 100 causes display unit 102 to display a message informing that a new apparatus has been authenticated (FIG. 17). For example, information on air conditioner 20 qualified as the authenticated control target apparatus is displayed at display unit 102. Accordingly, specific information of an apparatus is displayed according to the recognized state of remote control device 100. Thus, the user of remote control device 100 can conduct an operation directed to the apparatus without error.

Thus, remote control device 100 of the present embodiment receives a signal output from a control target apparatus to obtain information included in the signal in order to authenticate a control target apparatus. Following this authentication, remote control device 100 functions as a remote control device corresponding to the relevant control target apparatus. Accordingly, one terminal can be set to function as a remote control device 100 for each of a plurality of control target apparatuses.

<Modification of First Embodiment>

A modification of the present embodiment will be described hereinafter. A remote control device 1800 according to a modification of the present embodiment differs from the embodiment set forth above in that the configuration of the slit provided inside the casing of remote control device 100 differs from the configuration of internal slit portion 320 of remote control device 100.

Figure 18:
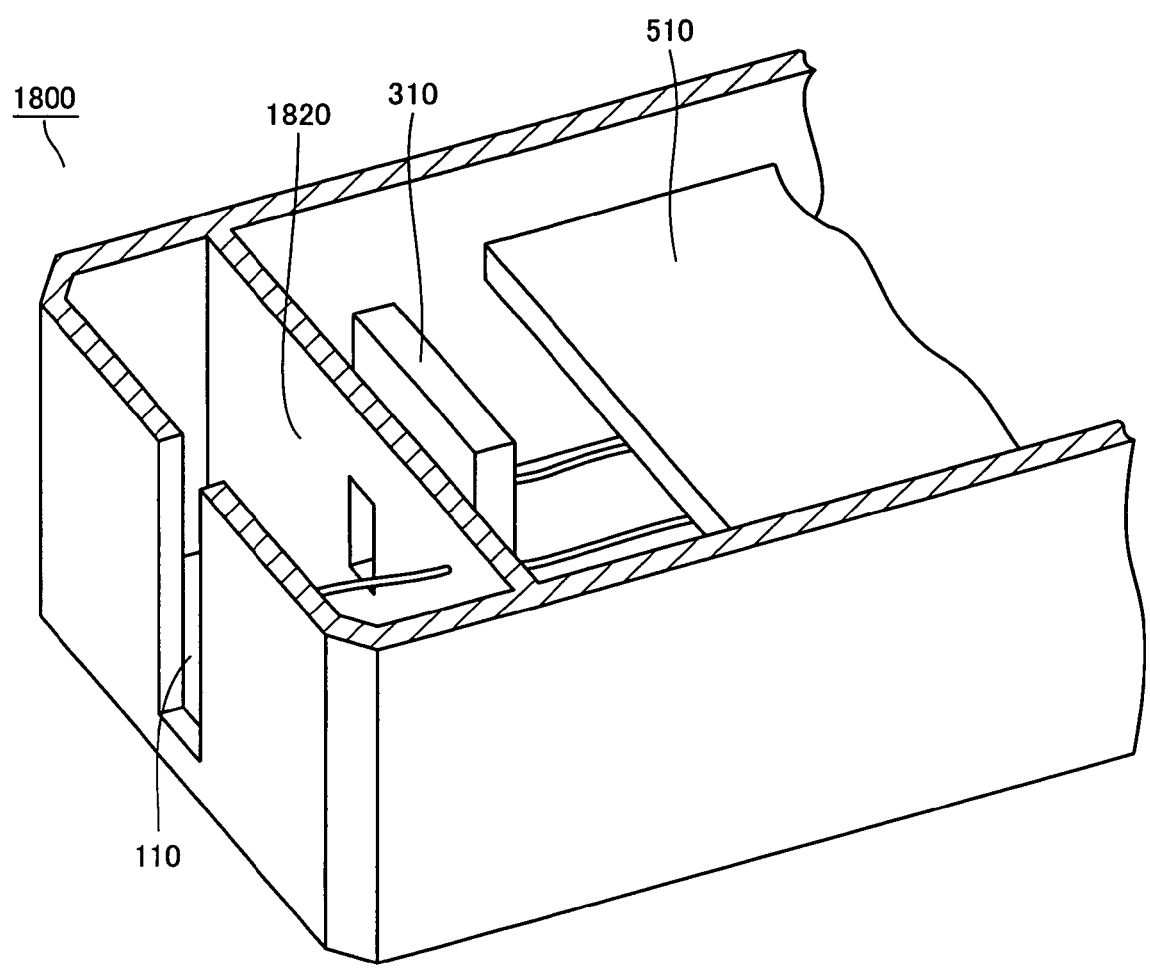
FIGS. 18 and 19 represent an appearance of a remote control device.

FIG. 18 represents an appearance of remote control device 1800 of the present modification. Remote control device 1800 includes, instead of internal slit portion 320, an internal slit portion 1820 having a rectangular opening formed. Internal slit portion 1820 is arranged between exterior slit portion 110 and light receiving element 310. Specifically, internal slit portion 1820 is arranged such that a light signal passing through external slit portion 110 goes through the opening in internal slit portion 1820. The light signal passing through internal slit portion 1820 is received at a predetermined light receiving region of light receiving element 310. The received signal is provided to control circuit 710.

In accordance with the configuration of internal slit portion 1820, the vertical spread of the optical signal incident on remote control device 1800 from an external source is suppressed. As a result, remote control device 1800 can receive more properly each optical signal output from a plurality of control target apparatuses stacked in the vertical direction to appropriately recognize an apparatus.

Second Embodiment

A remote control device 1900 according to a second embodiment of the present invention differs from remote control device 100 of the first embodiment in including a lens instead of external slit 110 at the outer surface of the casing.

Figure 19:
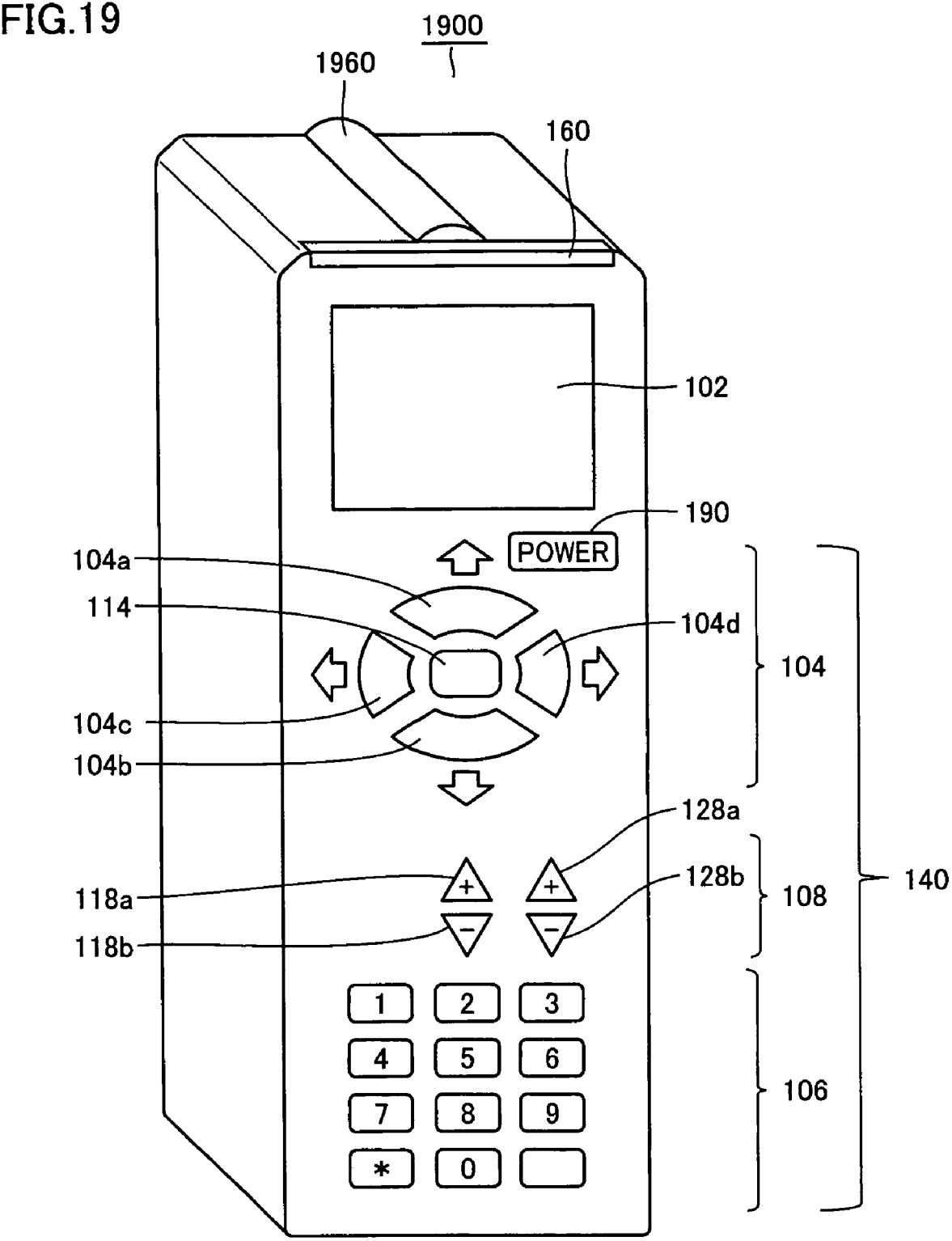

FIG. 19 represents an appearance of remote control device 1900. Remote control device 1900 includes a cylindrical lens 1960 at the head region (the light receiving face of an optical signal) of the casing. Cylindrical lens 1960 is arranged at, for example, the central region of the casing of remote control device 1900. The location of cylindrical lens 1960 is not limited to that shown in FIG. 19. Any arrangement is allowed as long as an optical signal transmitted from a control target apparatus can be received by remote control device 1900. The material of cylindrical lens 1960 is, for example, but not limited to, resin.

Figure 20:
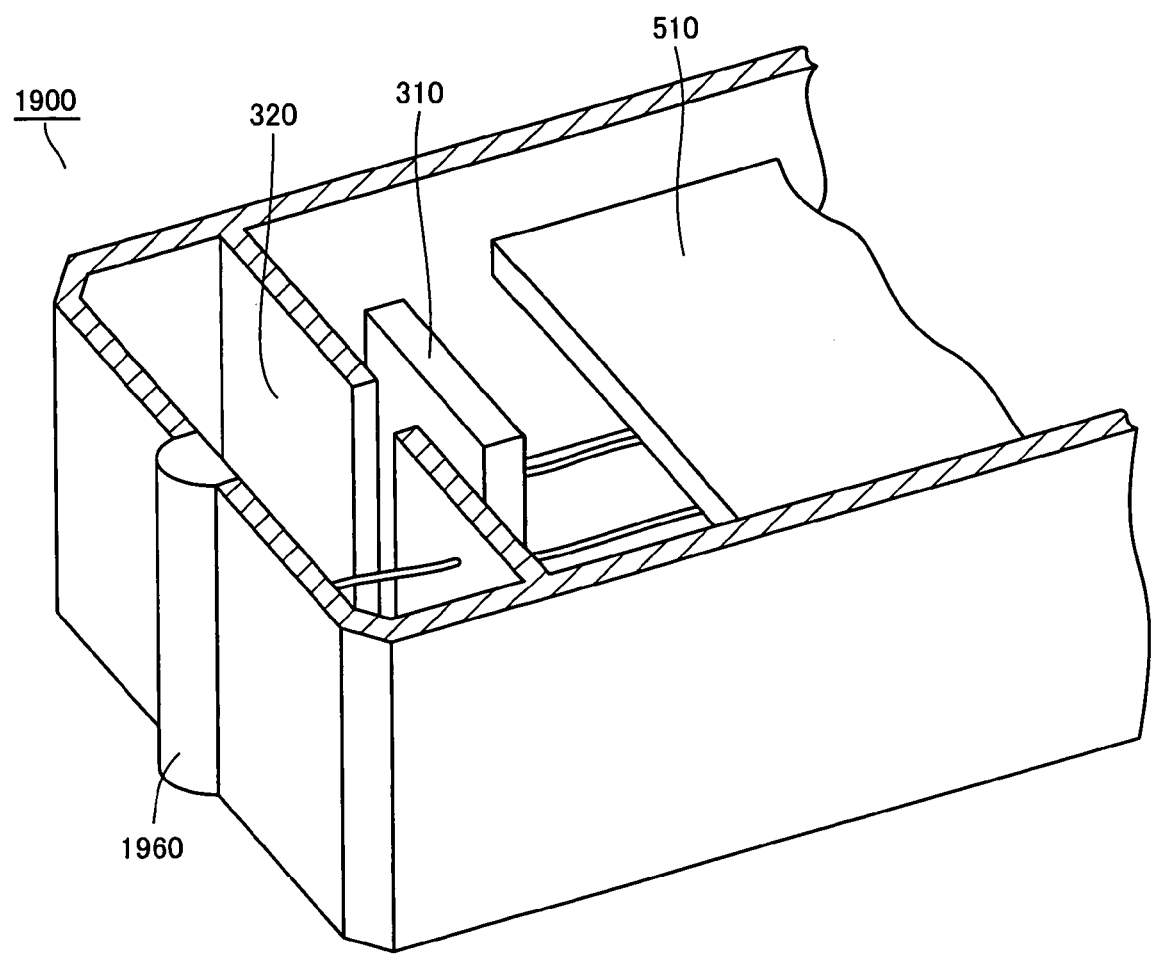
FIG. 20 schematically represents an internal configuration of a remote control device according to an embodiment of the present invention.

FIG. 20 schematically shows the internal configuration of remote control device 1900. Cylindrical lens 1960 is arranged in front of internal slit portion 320. The positional relationship between cylindrical lens 1960 and internal slit portion 320 is determined according to the optical property of cylindrical lens 1960. Specifically, cylindrical lens 1960, internal slit portion 320, and light receiving element 310 are arranged such that the line passing through the center of cylindrical lens 1960 crosses light receiving element 310 through slit 320.

The positional relationship between cylindrical lens 1960 and internal slit portion 320 does not have to be fixed. For example, a mechanism (for example, a dial for adjustment) to move cylindrical lens 1960 or internal slit 320 can be employed to fine-adjust the positional relationship.

Figure 21:
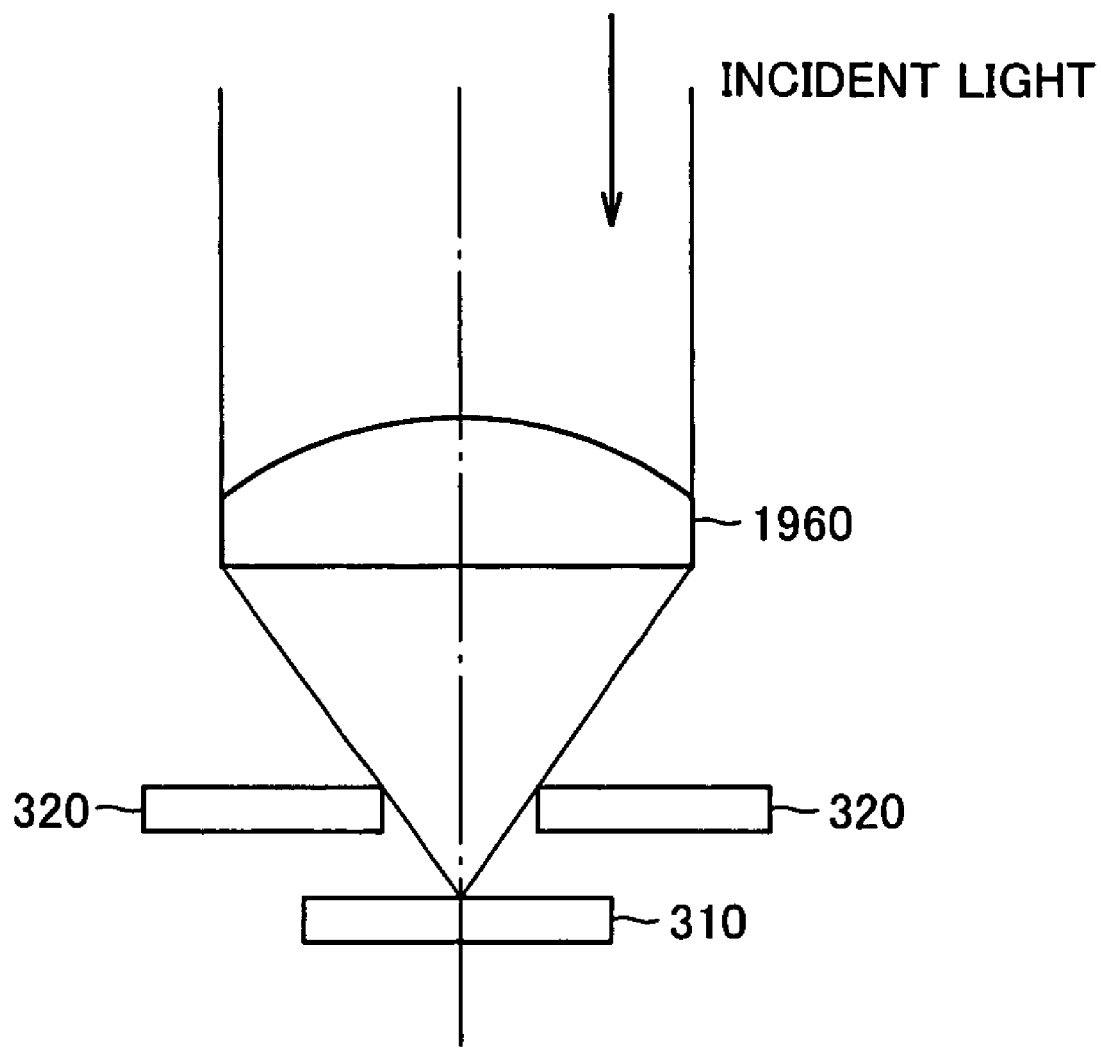
FIG. 21 represents an arrangement of a cylindrical lens, an internal slit, and a light receiving element.

With reference to FIG. 21, the optical property of remote control device 1900 according to the second embodiment will be described hereinafter. FIG. 21 represents the arrangement of cylindrical lens 1960, internal slit 320, and light emitting element 310. Cylindrical lens 1960 gathers incident optical light according to its optical property. The optical signal is focused on a predetermined site, i.e. on one straight line. By arranging light receiving element 310 relative to cylindrical lens 1960 to be located at such a site, and such that the opening of internal slit portion 320 regulates the optical signal, the optical signal transmitted from an apparatus can be received by remote control device 1900 with its lateral direction restricted.

Thus, remote control device 1900 of the second embodiment can receive at high accuracy an optical signal by cylindrical lens 1960 provided therein. A certain apparatus can be recognized properly by remote control device 1900 even in the case where various blinking signals emitted from a plurality of apparatuses can be received. The convenience is improved since the user can use remote control device 1900 as a remote control device for a certain apparatus.

<Modification of Second Embodiment>

A remote control device 2200 according to a modification of the second embodiment differs from the above embodiment in including a collimator lens 2260 instead of cylindrical lens 1960.

Figure 22:
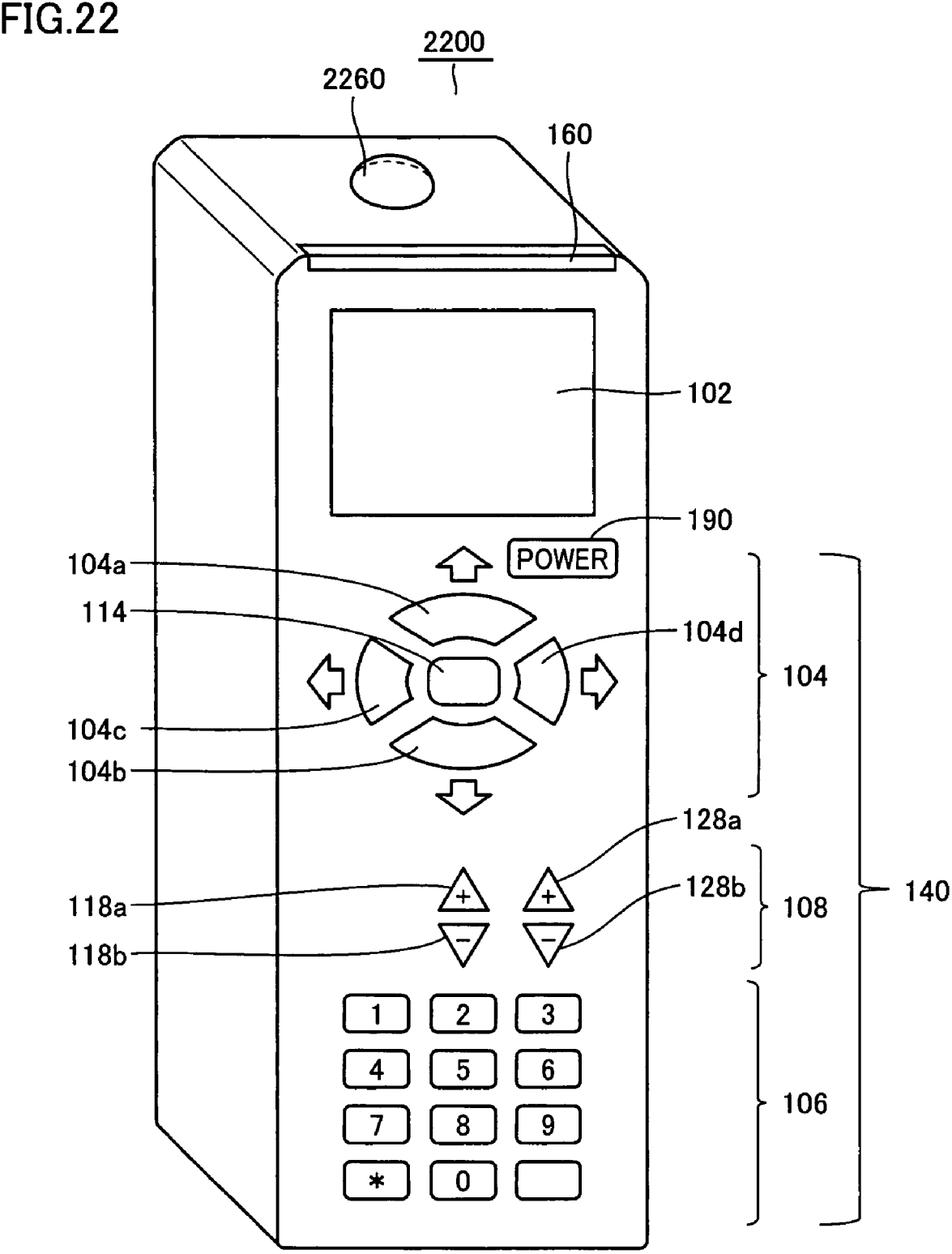
FIG. 22 represents an appearance of a remote control device according to an embodiment of the present invention.

FIG. 22 represents an appearance of remote control device 2200. Remote control device 2200 includes collimator lens 2260 at the head region of the casing. Collimator lens 2260 is provided in the proximity of, for example, light emitting unit 160. Collimator lens 2260 is formed of, but not limited to, resin, for example.

Figure 23:
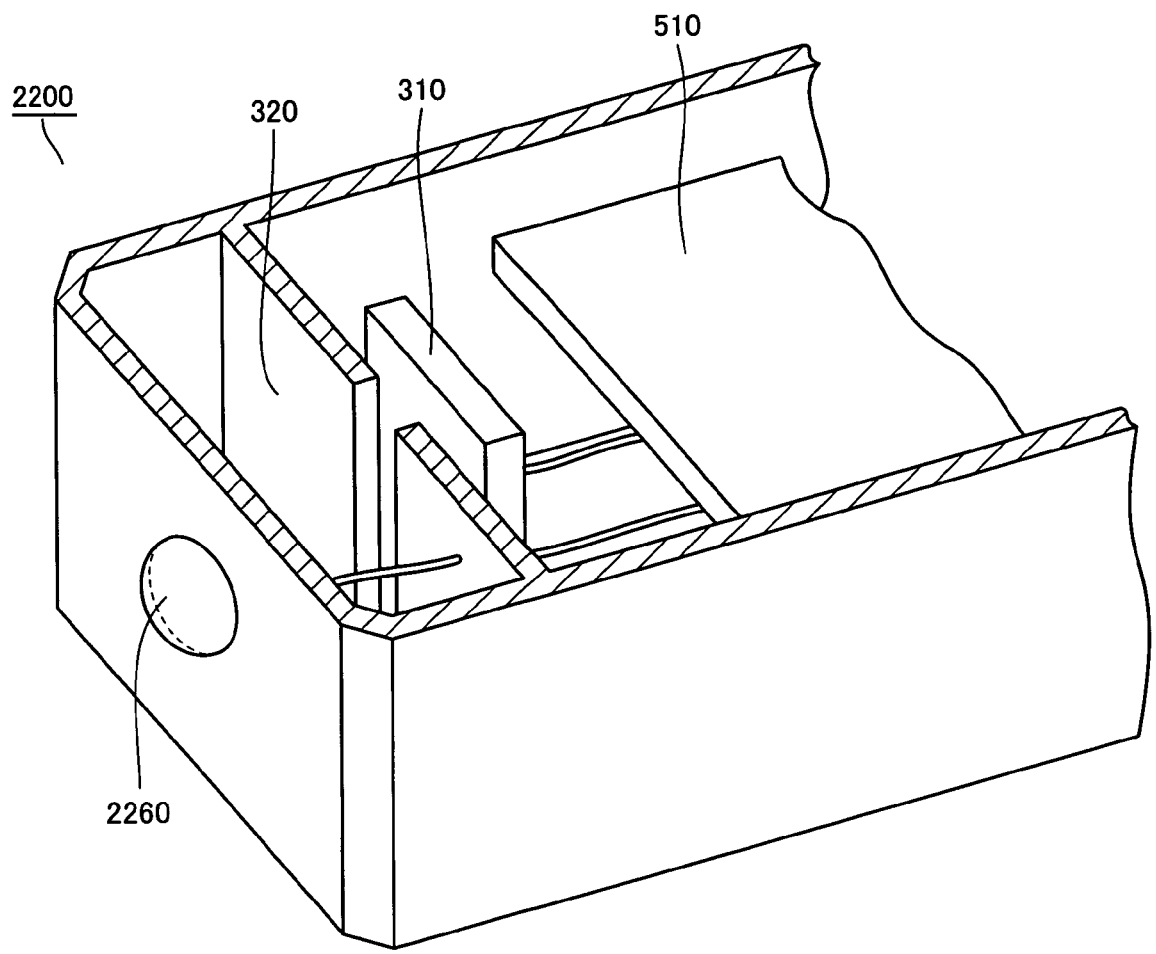
FIG. 23 schematically represents an internal configuration of a remote control device according to an embodiment of the present invention.

FIG. 23 schematically shows the internal configuration of remote control device 2200. Remote control device 2200 includes collimator lens 2260 at the center region of the casing. Collimator lens 2260 is arranged such that the center line thereof reaches light receiving element 310 through the opening of internal slit portion 320. Collimator lens 2260 is attached by a fit to an opening formed in the casing. By such a configuration, the optical signal passing through collimator lens 2260 is focused towards internal slit portion 320 to arrive at light receiving element 310. Light receiving element 310 converts the optical signal into an electrical signal for output to control circuit 710.

Collimator lens 2260 and the casing do not have to be fixed. For example, a dial type adjuster may be provided for collimator lens 2260. This adjuster rotatably moves collimator lens 2260 frontward and backwards. By rotating the adjuster after collimator lens 2260 is attached to the casing, the light receiving property of an optical signal at light receiving element 310 can be improved.

Thus, remote control devices 1900 and 2300 of the second embodiment includes a lens and an internal slit portion to restrict the optical signal in the lateral direction. By such a configuration, remote control devices 1900 and 2300 can receive an optical signal having the lateral spread suppressed. Even in the case where a plurality of apparatuses are arranged adjacent to each other, the user can discriminate a certain apparatus by means of remote control devices 1900 and 2300.

Third Embodiment

A remote control device 100 according to a third embodiment of the present invention differs from the terminal of the embodiments set forth above in that remote control device 100 is capable of transmitting a control signal in the form of a packet signal. Specifically, remote control device 100 converts a signal to control a control target apparatus into packet data. Remote control device 100 emits the packet data as a radio signal. An apparatus capable of receiving such a radio signal obtains packet data generated by terminal 100, when such a radio signal is received, and transmits the obtained packet data to a certain control target apparatus.

The hardware configuration of the remote control device of the third embodiment is similar to that described in each of the embodiments set forth above. The function is also similar. Therefore, details thereof will not be repeated here.

Figure 24:
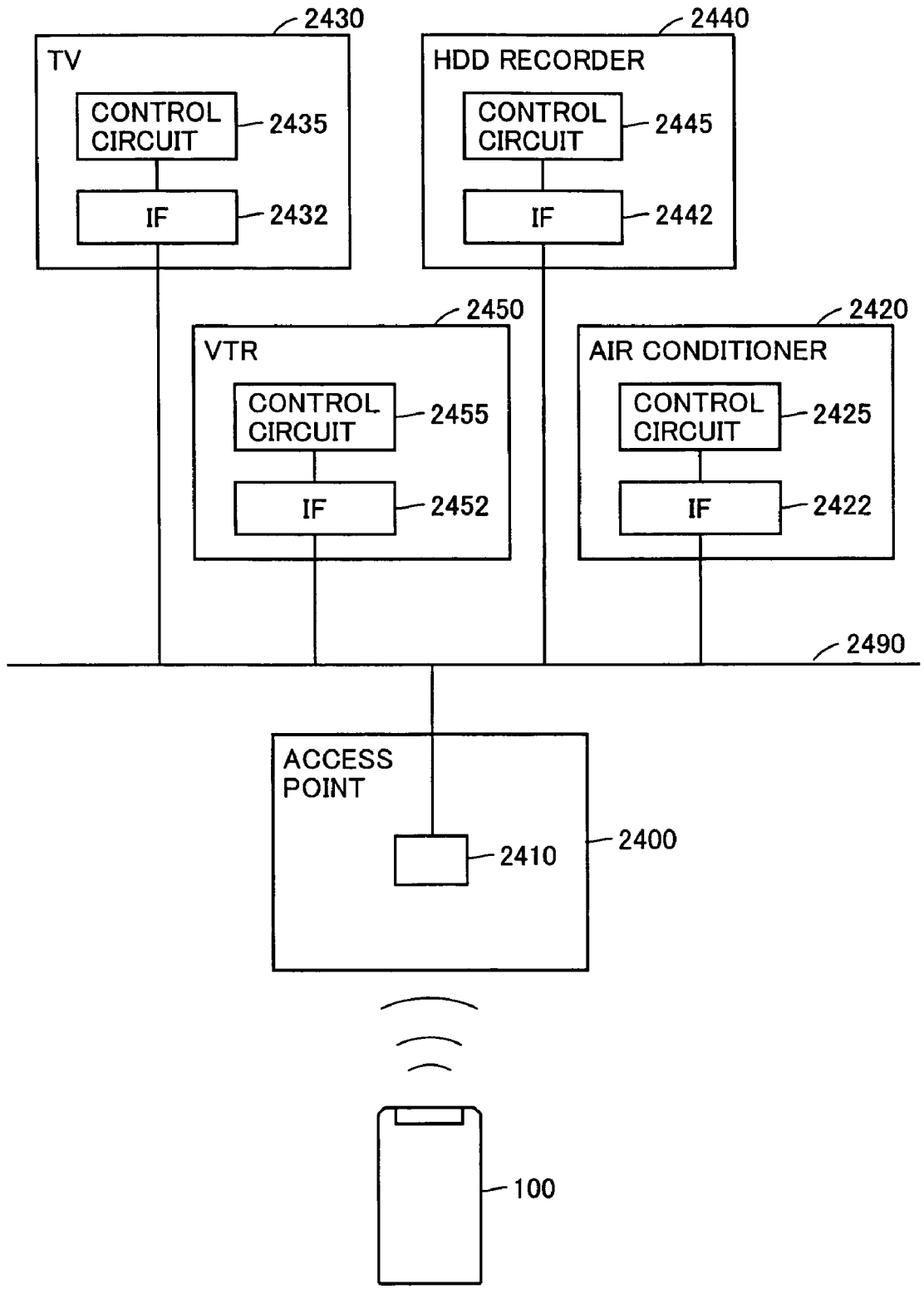
FIG. 24 represents a manner in which control target apparatuses that can be controlled by a remote control device according to an embodiment of the present invention are connected on a network.

With reference to FIG. 24, a usage mode of remote control device 100 according to the third embodiment will be described. FIG. 24 represents control target apparatuses under control of remote control device 100 connected on a network 2490.

An access point 2400 to receive a radio signal is connected on network 2490. Access point 2400 includes a communication interface 2410 receiving a signal emitted from remote control device 100 to transmit packet data to a certain control target apparatus via network 2490. Communication interface 2410 identifies the network address included in the packet data, and transmits a control signal towards the identified address.

Network 2490 further has a television 2430, an air conditioner 2420, an HDD recorder 2440, and a VCR (Video Cassette Recorder) 2450 connected thereon. Air conditioner 2420 includes an interface 2422 connected on network 2490 to receive data input from network 2490, and a control circuit 2425 to control an operation of air conditioner 2420 based on a control signal input via interface 2422.

Television 2430 includes an interface 2432 receiving a control signal input from network 2490, and a control circuit 2435 executing a process to control the operation of television 2430 based on a control signal received via interface 2432.

HDD recorder 2440 includes an interface 2442 receiving an input of a signal from network 2490, and a control circuit 2445 executing a process to control an operation of HDD recorder 2440 based on the received signal.

VCR 2450 includes an interface 2452 connected on network 2490 to receive an input of a signal from network 2490, and a control circuit 2455 executing a process to control an operation of VCR 2450 based on the received signal.

Each of interfaces 2422, 2432, 2442, and 2452 of respective control target apparatuses corresponds to a light receiving unit receiving a remote control signal in the case where a control target apparatus is used solely. The control circuit in respective control target apparatuses corresponds to, for example, a system control circuit 710 that realizes HDD recorder 40 shown in FIG. 7.

Since each control circuit executes a particular process based on a signal from the interface to which it is electrically connected, a similar process can be executed even if a control target apparatus is connected on network 2490.

According to remote control device 100 of the third embodiment, each control target apparatus connected on network 2490 can be controlled. In other words, in the control of the operation of respective control target apparatuses, the user of remote control device 100 does not have to alter the direction of remote control device 100 according to each control target apparatus. The user only needs to emit a control signal towards access point 2400. As long as access point 2400 is placed in a range that allows transmission of an optical signal from the neighborhood of an area where the user is generally placed (for example, the sofa, another certain chair, or the like), the user can control each control target apparatus without changing his/her posture. Accordingly, a control signal from remote control device 100 can be sent to a relevant control target apparatus via access point 2400 even in the case where there is an obstacle between the remote control device and a certain control target apparatus. Thus, control of a control target apparatus is ensured.

Fourth Embodiment

A remote control device 100 according to a fourth embodiment of the present invention differs from the embodiments set forth above in that information to authenticate a control target apparatus is obtained from the access point.

The hardware configuration of the remote control device of the fourth embodiment is similar to that of the remote control device in each of the embodiment set forth above. The function is also identical. Therefore, detailed description thereof will not be repeated.

Figure 25:
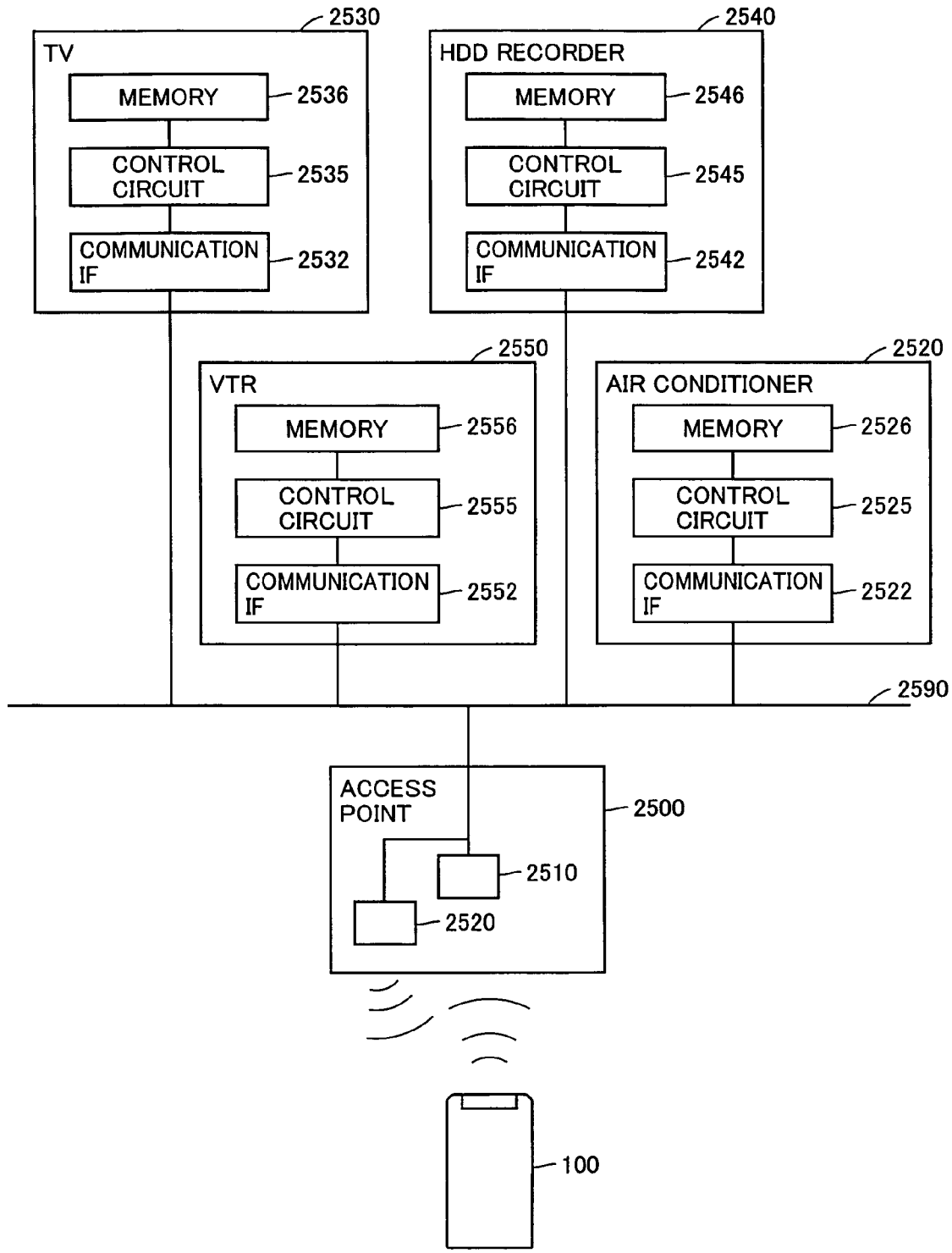
FIG. 25 represents a manner in which apparatuses capable of transmitting information to identify itself as a target via a network are connected on the network.

With reference to FIG. 25, a usage mode of a remote control device according to the fourth embodiment will be described hereinafter. FIG. 25 represents a mode in which apparatuses capable of transmitting information to identify itself via a network are connected on the network.

An air conditioner 2520, a television 2530, an HDD recorder 2540, a VCR 2550, and an access point 2500 are connected on a network 2590. Access point 2500 includes a reception unit 2510 receiving a signal from remote control device 100, and a emitting unit 2520 transmitting a signal in which information identifying each control target apparatus is included based on a signal received via network 2590.

Air conditioner 2520 includes a control circuit 2425, a communication interface 2522 connected on network 2590 for communication with access point 2500 via network 2590, and a memory 2526 storing information to identify air conditioner 2520.

Television 2530 includes a control circuit 2435, a communication interface 2532 to communicate with access point 2500 via network 2590, and a memory 2536 storing information to identify television 2530.

HDD recorder 2540 includes a control circuit 2445, a communication interface 2542 connected on network 2590 to communicate information with access point 2500 via network 2590, and a memory 2546 storing information to identify HDD recorder 2540.

VCR 2550 includes a control circuit 2455, a communication interface 2552 connected on network 2590 to communicate information with access point 2500 via network 2590, and a memory 2556 storing information to identify VCR 2550.

In each control target apparatus, the information stored in each of memories 2526, 2536, 2546, and 2556 includes, for example, a manufacturer code, apparatus number, production number, and the like included in the signal shown in FIG. 9. The address (not shown) of network 2590 of each control target apparatus is also stored in each of these memories.

Each of control circuits 2525, 2535, 2545 and 2555 generate packet data to be transmitted to access point 2500 based on the information to identify a control target apparatus and network address stored in each memory. Each control circuit transmits data towards access point 2500 via a communication interface included in each apparatus.

Based on data input via a network 2590, access point 2500 causes emitting unit 2520 to emit a signal containing the data. The signal transmitted from access point 2500 differs depending upon which control target apparatus connected on network 2590 dispatches the aforementioned packet data.

For example, in the case where packet data is dispatched by air conditioner 2520, access point 2500 generates a signal containing the information to identify air conditioner 2520, and emits the generated signal. In the case where packet data is dispatched by HDD recorder 2540 according to another aspect, access point 2500 generates a signal containing the information to identify HDD recorder 2540, and emits the generated signal. Thus, remote control device 100 can communicate with each control target apparatus via access point 2500. Therefore, authentication of a control target apparatus and transmission of a control signal following authentication can be readily conducted.

Figure 26:
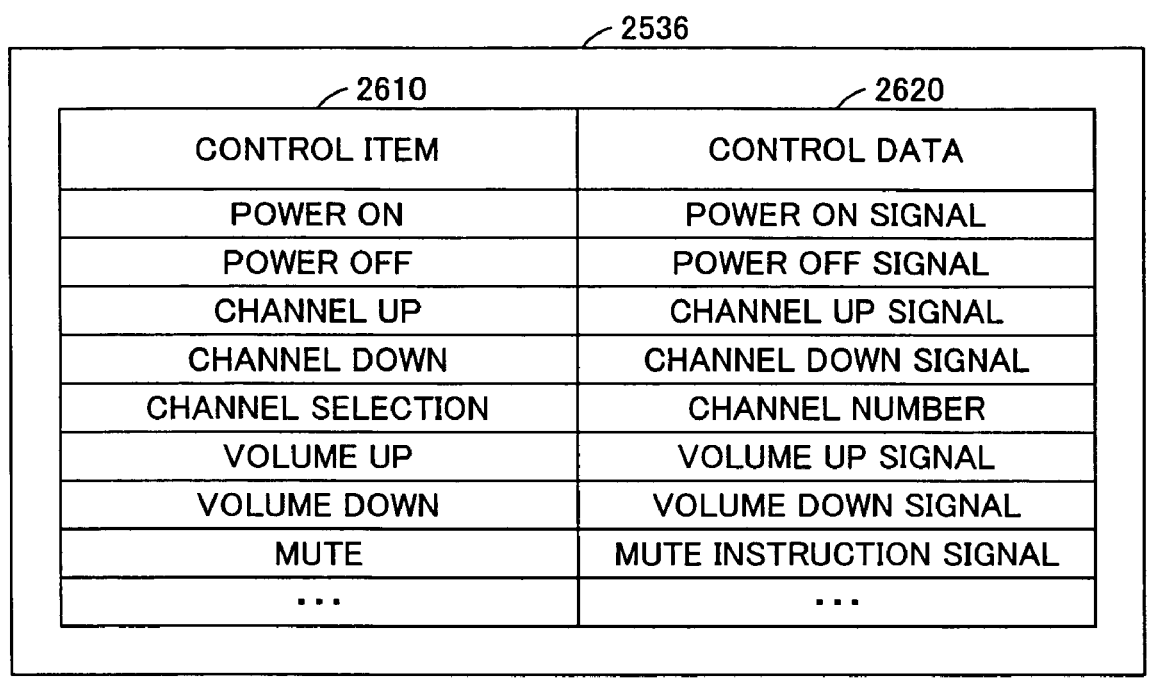
FIG. 26 represents a manner of storing control items and control data in a memory.

With reference to FIG. 26, a data configuration of television 2530 according to the third embodiment of the present invention will be described hereinafter. FIG. 26 represents a manner of storing control items and control data in a memory 2536.

Memory 2536 includes regions 2610 and 2620 to store data. Data representing a control item is stored in region 2610. Control data determined in advance according to each control item is stored in region 2620. A control item is set in association with respective control data. With regards to a control item "power on", for example, a signal to instruct power on is set in association as the control data. With regards to control item "channel selection", a channel number is set in association as the control data. By storing data having a control item and control data set in association in the memory of a control target apparatus, each apparatus can execute an operation according to the control signal of remote control device 100 received via access point 2500. In other words, when the signal from remote control device 100 corresponds to any of the control items, the relevant control circuit controls the operation of a relevant control target apparatus by providing a signal output corresponding to the item.

According to the present embodiment, remote control device 100 can reliably obtain information of each control target apparatus by communication through access point 2500. As a result, remote control device 100 can authenticate each apparatus properly. Further, remote control device 100 can obtain information properly to define an operation of each apparatus. Thus, remote control device 100 can function to control a plurality of control target apparatuses.

Fourth Embodiment

According to a fourth embodiment of the present invention, control data set forth above may be prestored in a control target apparatus, or sequentially obtained from an external source. For example, control data to cause respective control target apparatuses to execute an exclusive operation can be stored at a server that provides the home page of the manufacturer of each control target apparatus, and the control data of a relevant control target apparatus can be transmitted to the apparatus requesting transmission of such control data in response to an access to the relevant server.

The hardware configuration of a remote control device of the fourth embodiment is similar to that of the embodiments set forth above. The function is also identical. Therefore, description thereof will not be repeated.

Figure 27:
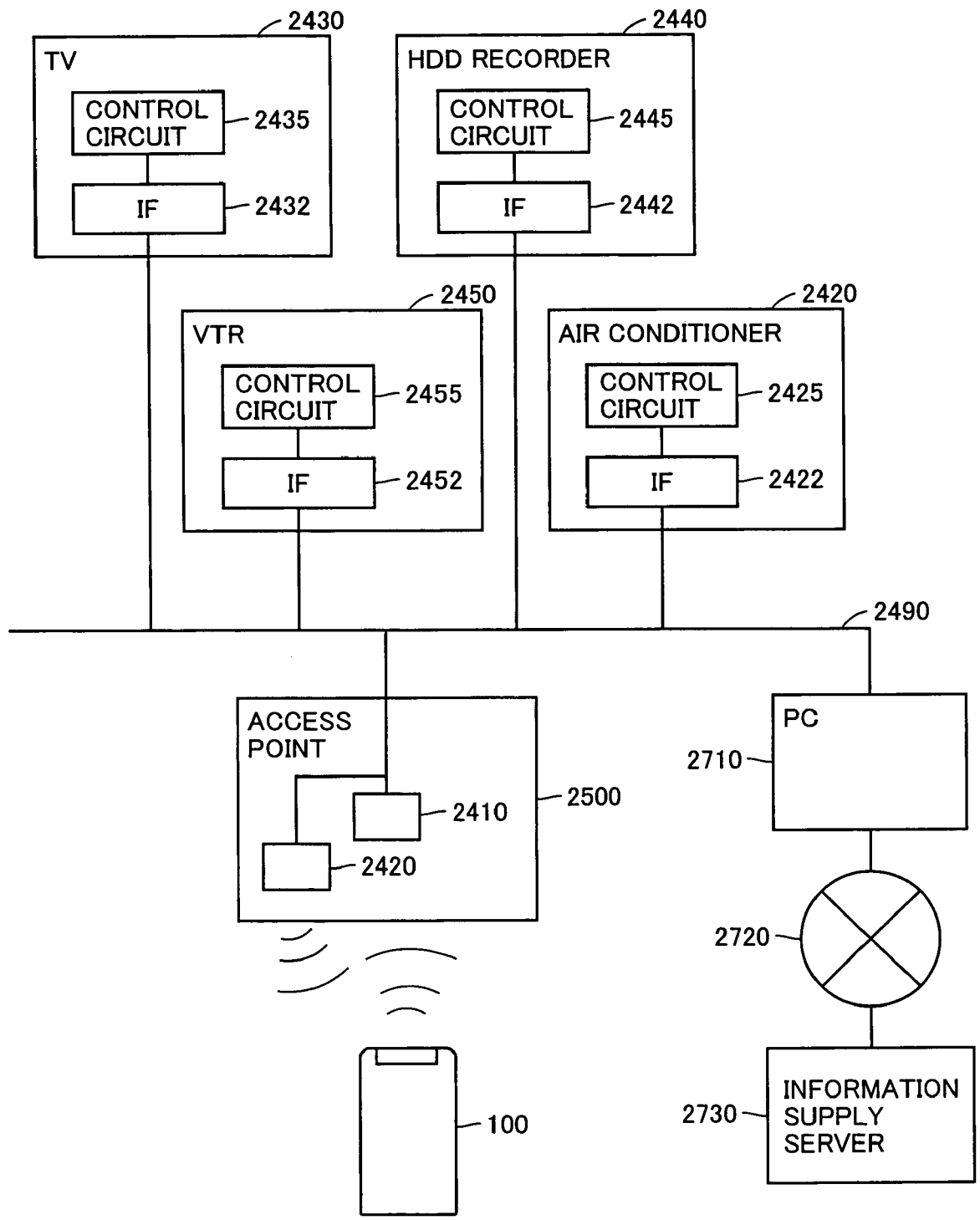
FIG. 27 represents a manner in which control target apparatuses under control of a remote control device according to an embodiment of the present invention are connected to the Internet.

With reference to FIG. 27, a usage mode of remote control device 100 according to the fourth embodiment will be described hereinafter. FIG. 27 represents a manner in the case where control target apparatuses of remote control device 100 are connected on the Internet.

A PC (Personal Computer) 2710 is connected on network 2490. PC 2710 is connected to an information supply server 2730 via the Internet 2720. PC 2710 used herein is a general computer system installed in the residence of the user of remote control device 100. Information supply server 2730 is a computer system organized by the manufacturers of air conditioner 2420, television 2430, HDD recorder 2440, VCR 2450, and the like. It is to be noted that, since information supply server 2730 may or may not be present depending upon each control target apparatus, control through remote control device 100 is not realized always by only one server, as shown in FIG. 27.

Information supply server 2730 is realized by, for example, a general computer system. The hardware configuration, operation, and the realized function of such a computer system are well-known. The function includes the function to transmit the relevant data to the transmission request source in response to receiving a data transmission request. Therefore, detailed description will not be repeated except for the description provided afterwards.

Figure 28:
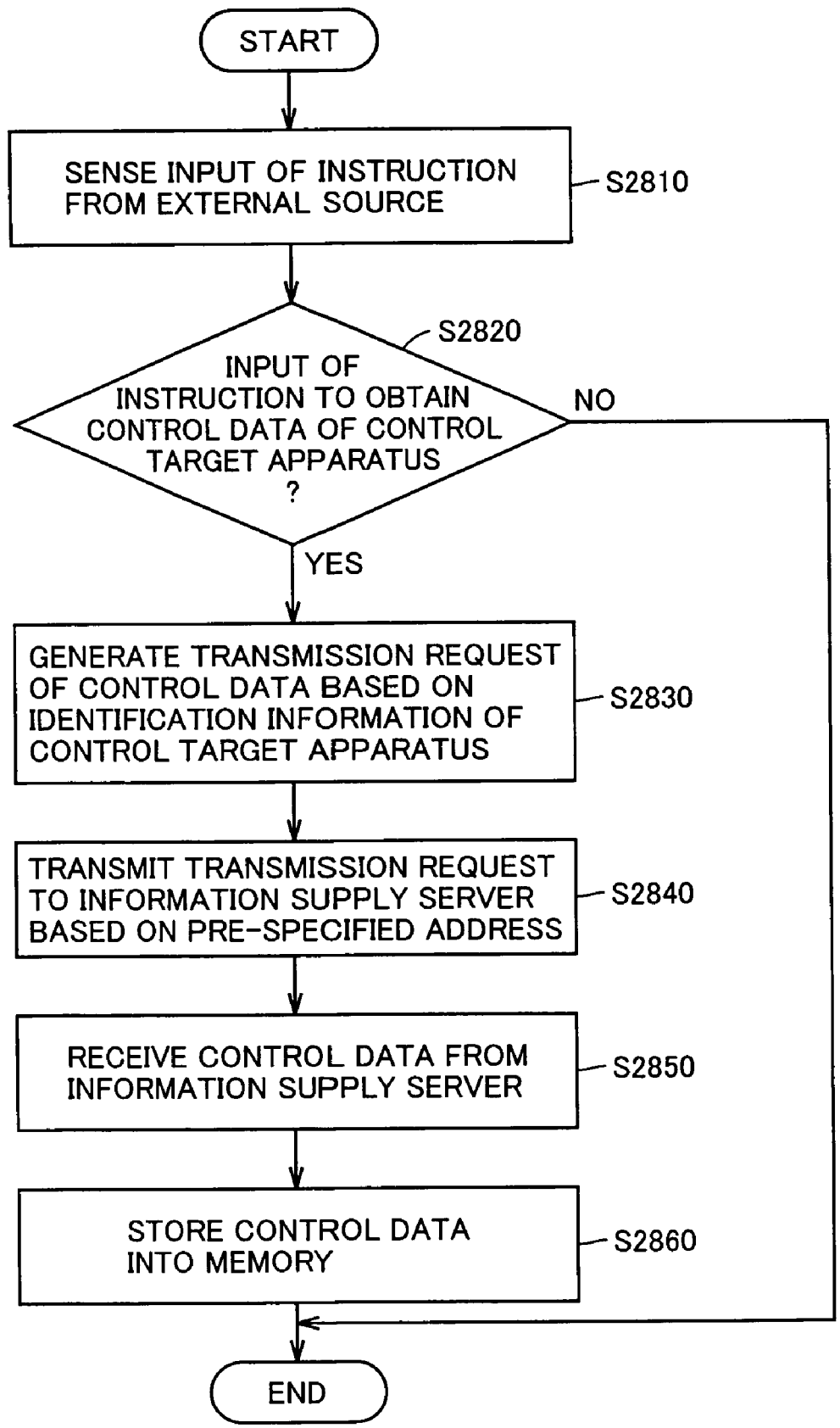
FIG. 28 is a flowchart of procedures executed by a control circuit to receive a control item of a control target apparatus.

With reference to FIG. 28, a control configuration of remote control device 100 according to the fourth embodiment will be described hereinafter. FIG. 28 is a flowchart representing procedures executed by control circuit 510 to receive a control item of a control target apparatus.

At step S2810, control circuit 510 senses an input of an instruction from an external source based on an input via operation unit 140. At step S2820, control circuit 510 determines whether an instruction to obtain a control item and control data of a control target apparatus is input or not based on the relevant input. When control circuit 510 determines that such an instruction is input (YES at step S2820), control proceeds to step S2830; otherwise (NO at step S2820), the process ends.

At step S2830, control circuit 510 generates a transmission request of control data of the relevant control target apparatus based on the identification information of the control target apparatus stored in flash memory 520. This transmission request includes, for example, the relevant identification information, information to identify remote control device 100, and a predetermined communication protocol with respect to an information supply server that will be described afterwards. This protocol is determined in advance to request transmission of control data.

At step S2840, control circuit 510 sends a transmission request to information supply server 2730 based on an address designated in advance. When information supply server 2730 receives this request, a packet to transmit control data to the designated apparatus is generated and sent to remote control device 100 that is the relevant request transmission source. This packet is received at PC 2710 and transmitted again on network 2490. Access point 2500 receives the data from PC 2710. Emitting unit 2520 transmits that data in the form of an infrared signal, for example.

At step S2850, control circuit 510 receives the control item and control data transmitted from information supply server 2730 via access point 2500. At step S2860, control circuit 510 stores the received control item and control data in a predetermined data region in flash memory 520. Thus, remote control device 100 obtains the control item and control data to control an operation that can be executed by a certain control target apparatus. Remote control device 100 can then generate a signal to control the relevant control target apparatus based on an externally applied instruction.

Figure 29:
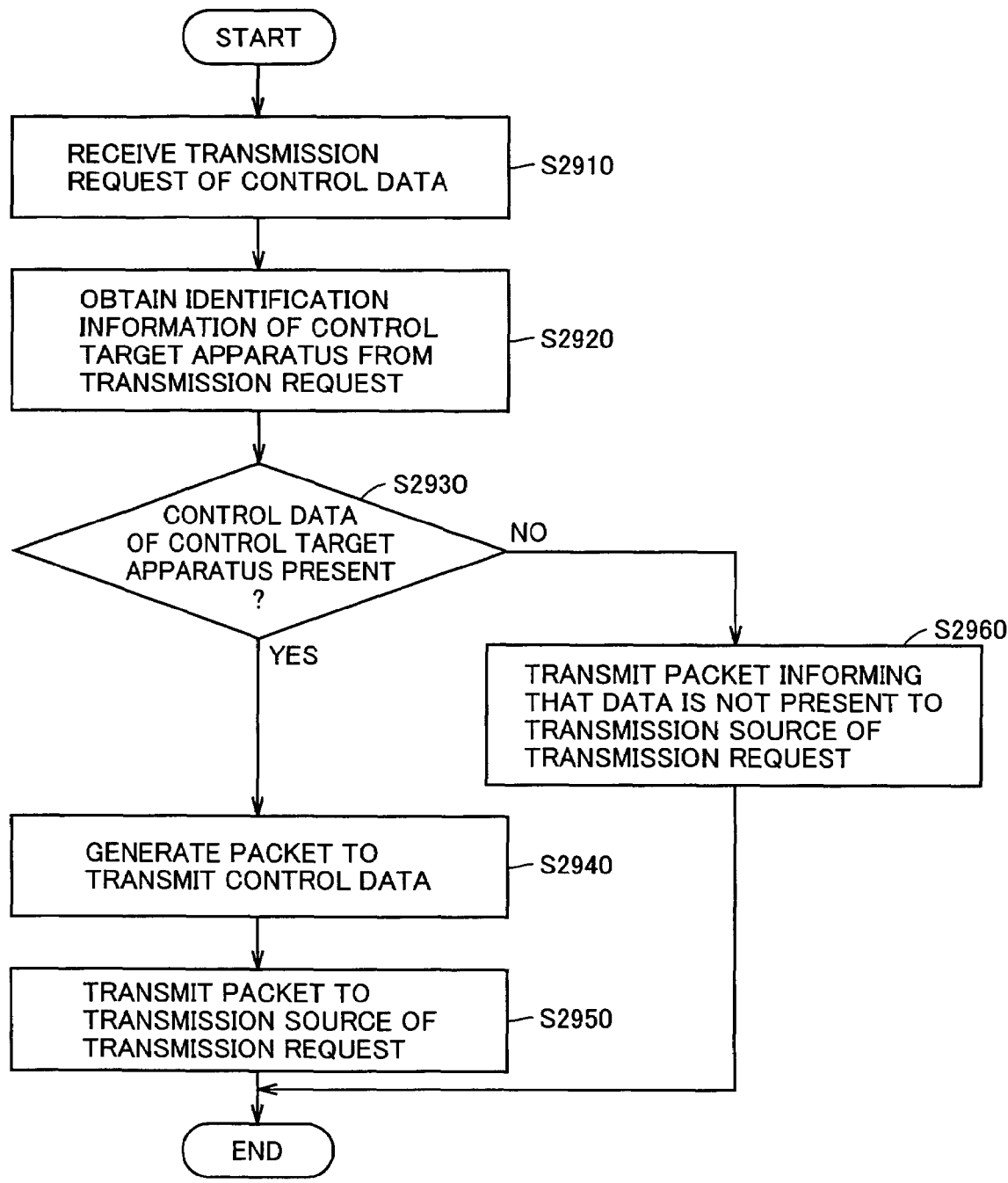
FIG. 29 is a flowchart of procedures executed by an information supply server.

With reference to FIG. 29, a control configuration of information supply server 2730 according to the fourth embodiment will be described hereinafter. FIG. 29 is a flowchart representing procedures executed by information supply server 2730.

Information supply server 2730 is realized by a computer system generally known, as mentioned above. The computer system typically includes a communication interface to communicate with an external network, a memory to store data, and a CPU and/or another processor to execute a predetermined process based on the data. Therefore, the following description is provided assuming that the operation of information supply server 2730 is realized by a relevant CPU.

At step S2910, the CPU receives a transmission request of the control item and control data of a control target apparatus via network 2490 and Internet 2720. At step S2920, the CPU obtains the identification information of a control target apparatus from the transmission request. The obtained identification information includes, for example, the manufacturer code, apparatus number, production number, and the like of a control target apparatus (FIG. 9).

At step 2930, the CPU determines whether the control item and control data of a control target apparatus are present in the memory. When the CPU determines that the control item and control data are present in the memory (YES at step S2930), control proceeds to step S2940; otherwise (NO at step S2930), control proceeds to step S2960.

At step S2940, the CPU generates a packet to transmit the control item and control data. This packet includes a header, and a data body in which the control item and control data are contained. At step S2950, the CPU transmits the data towards the transmission source of the transmission request (i.e. remote control device 100). In the case where network 2490 is constantly connected to the Internet via PC 2710, remote control device 100 can receive the data promptly. In the case where network 2490 is not constantly connected to the Internet, the well-known process to establish communication is conducted between PC 2710 and network 2490.

At step S2960, the CPU generates a packet to inform that the control item and control data of the control target apparatus are not present, and transmits the generated data to the transmission source of the transmission request (remote control device 100). Upon receiving such a packet, remote control device 100 displays a message based on the received data at display unit 102.

According to the fourth embodiment, when information to control a control target apparatus is provided by an external information supply provider or the like (for example, the manufacturer of the control target apparatus), remote control device 100 can obtain information via Internet 2720. Since remote control device 100 can always obtain the latest information of the control target apparatus, control can be realized accurately even if the control target apparatus is capable of being upgraded.

Specifically, in the case where extension, addition, or the like of a function is allowed by updating the firmware of the control target apparatus, remote control device 100 can obtain information to control the control target apparatus even if the control target apparatus has a function extended or added. As a result, remote control device 100 can accommodate the so-called model change related to addition of a function to the control target apparatus, with the aforementioned convenience improved. This can prevent the relevant remote control device from being discarded due to an insufficient control function therein.

Fifth Embodiment

A remote control device 100 according to a fifth embodiment of the present invention differs from the embodiments set forth above in that it receives a signal from a remote control device exclusive to the control target apparatus to function as a remote control device of the control target apparatus based on the signal.

The hardware configuration of the remote control device of the fifth embodiment is similar to that of the embodiments set forth above. The function is also similar. Therefore, detailed description thereof will not be repeated.

With reference to FIG. 30, a usage mode of remote control device 100 according to the fifth embodiment will be described hereinafter. FIG. 30 represents the communication state of a signal by remote control device 100 and a remote control device 3000 exclusive to the control target apparatus.

Remote control device 3000 transmits a predetermined control signal according to a certain apparatus. For example, when the user of remote control device 3000 depresses button "1", the control signal containing the information corresponding to the depressed button is emitted from the light emitting unit of remote control device 3000. By arranging external slit portion 110 of remote control device 100 according to the fifth embodiment at a site where the control signal emitted from remote control device 3000 can be received, remote control device 100 can obtain the information emitted from remote control device 3000.

Figure 31:
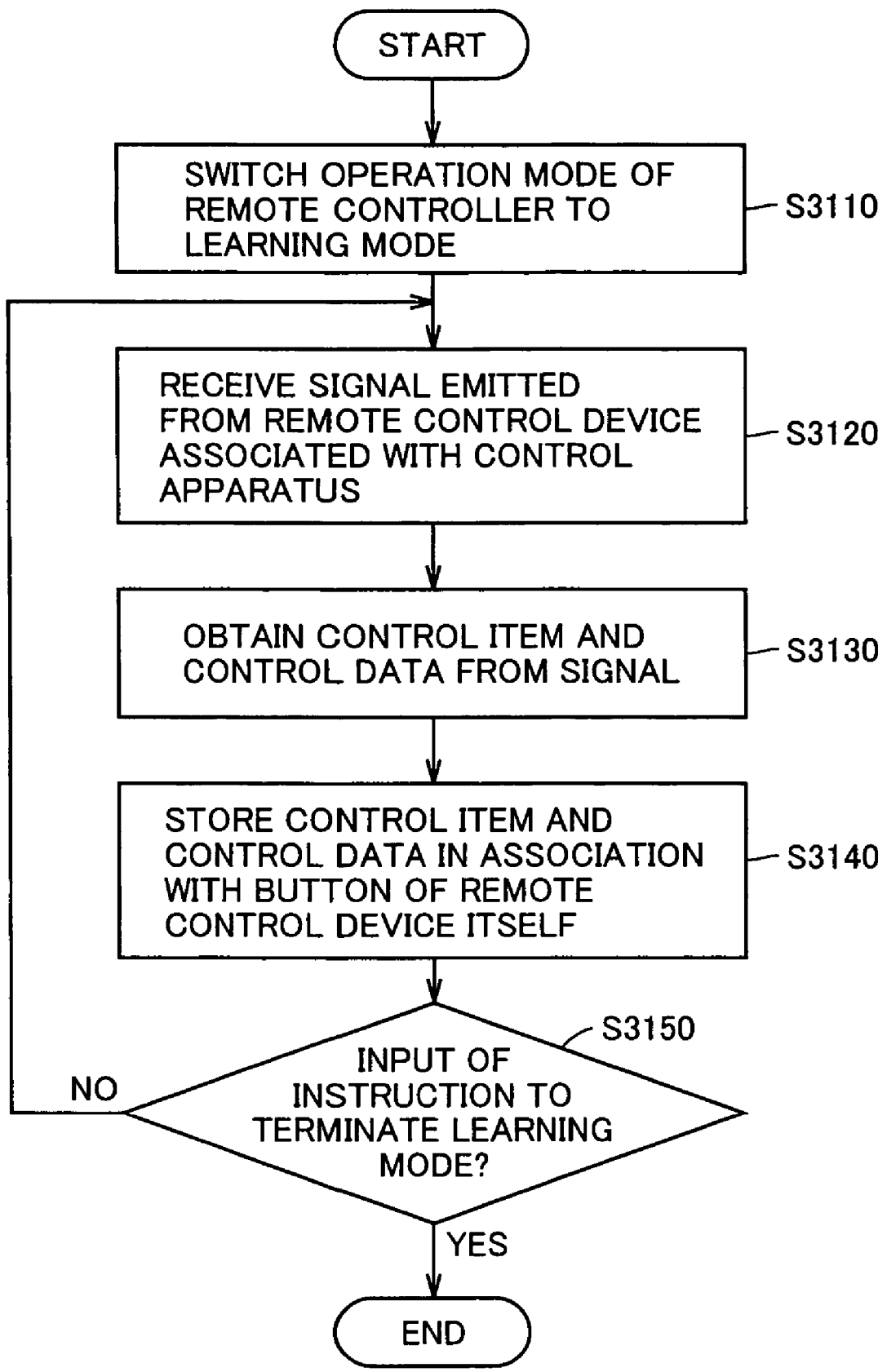
FIG. 31 is a flowchart of procedures executed for a remote control device according to an embodiment of the present invention to learn functions of another remote control device.

With reference to FIG. 31, the control configuration of remote control device 100 according to the fifth embodiment of the present invention will be described hereinafter. FIG. 31 is a flowchart representing procedures executed by remote control device 100 to learn the function of another remote control device 3000. Based on this learning, internal data of remote control device 3000 is transmitted to remote control device 100.

At step S3110, control circuit 710 of remote control device 100 switches to a learning mode from its own operation mode. As used herein, a learning mode refers to the mode of conducting the process of storing information included in the received signal into a predetermined data region in flash memory 520.

At step S3120, control circuit 710 receives a signal emitted from remote control device 3000 associated with the control target apparatus. At step S3130, control circuit 710 obtains the control item and control data from the received signal. The control item and control data obtained in this case corresponds to the control item and data instructing such an item in response to an operation of a certain button (for example, depression) at remote control device 3000.

At step S3140, control circuit 710 stores in a region of flash memory 520 the obtained control item and control data in association with the operation unit (for example, numeric button) of remote control device 100. The manner of storage corresponds to the storage shown in, for example, regions 640 and 650 in FIG. 6.

At step S3150, control circuit 710 determines whether a learning mode end instruction is input or not. This determination is made based on whether the signal output corresponding to an input via operation unit 140 is a signal instructing termination of the learning mode. When control circuit 710 determines that an end instruction has been input (YES at step S3150), the process ends; otherwise (NO at step S3150), control returns to step S3140, and then the process to obtain another control data of remote control device 3000 is continued.

By receiving a signal from a remote control device originally dedicated to the control target apparatus, remote control device 100 of the present embodiment can obtain information to control the relevant control target apparatus. Therefore, remote control device 100 can properly operate as a remote control device of a certain control target apparatus since remote control device 100 will no longer obtain erroneous information due to noise or another factor that may occur in obtaining data via a communication line.

Sixth Embodiment

A remote control device according to a sixth embodiment of the present invention differs from the embodiments set forth above in that, when identification information differing from the identification information stored in flash memory 520 is obtained, that newly obtained identification information is stored. Specifically, modification of an apparatus that is the subject of control by remote control device 100 can be sensed based on a difference in the identification information.

The hardware configuration of the remote control device of the sixth embodiment is similar to that of the various embodiments set forth above. The function thereof is also similar. Therefore, description thereof will not be repeated here.

Figure 32:
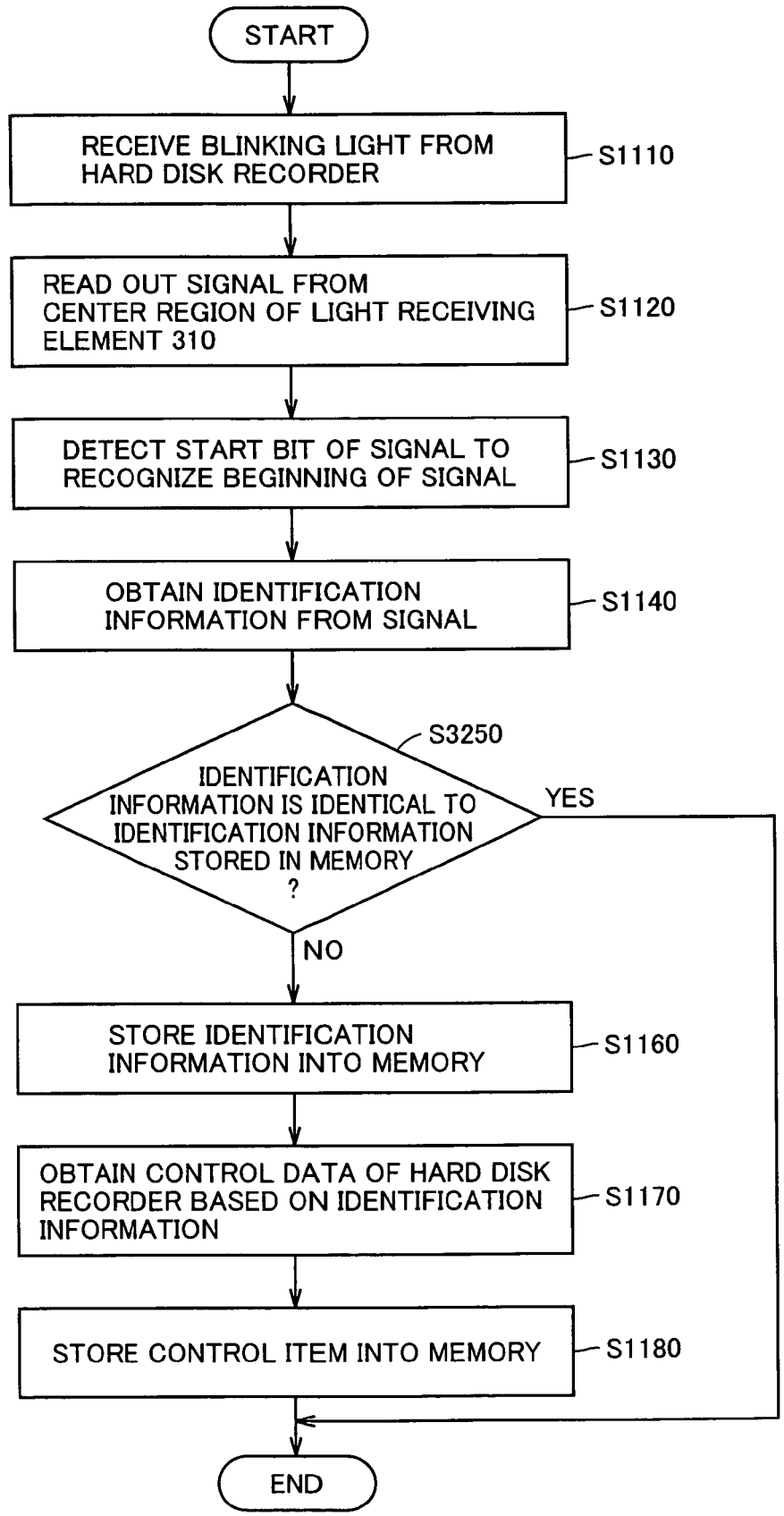
FIG. 32 is a flowchart of procedures executed by a control circuit to update control items of a control target apparatus.

With reference to FIG. 32, a control configuration of remote control device 100 according to the sixth embodiment of the present invention will be described. FIG. 32 is a flowchart representing procedures to be executed by control circuit 710 to update a control item of a control target apparatus. Steps identical to those described previously in the various embodiments set forth above have the same step number allotted. Therefore, description thereof will not be repeated.

At step S3250, control circuit 710 determines whether the obtained information is identical to the identification information stored in flash memory 520. When control circuit 710 determines that the identification information is identical (YES at step S2550), the process ends; otherwise (NO at step S2550), control proceeds to steps S1160 to obtain identification information, control item, and control data (steps S1160-S1180).

When the remote control device of the sixth embodiment recognizes, as a result of an authentication process, an apparatus different from the apparatus already recognized, data to control the newly recognized apparatus is obtained. In the case where recognition is made again of an apparatus identical to the apparatus that has been already recognized, relevant data is not obtained. Accordingly, the remote control device switches to function for another control target apparatus while still functioning as a remote control device corresponding to the same apparatus. Therefore, remote control device 100 can be operated as a terminal for a certain control target apparatus regardless of whether the user of remote control device 100 is the same user or not.

Seventh Embodiment

Figure 33:
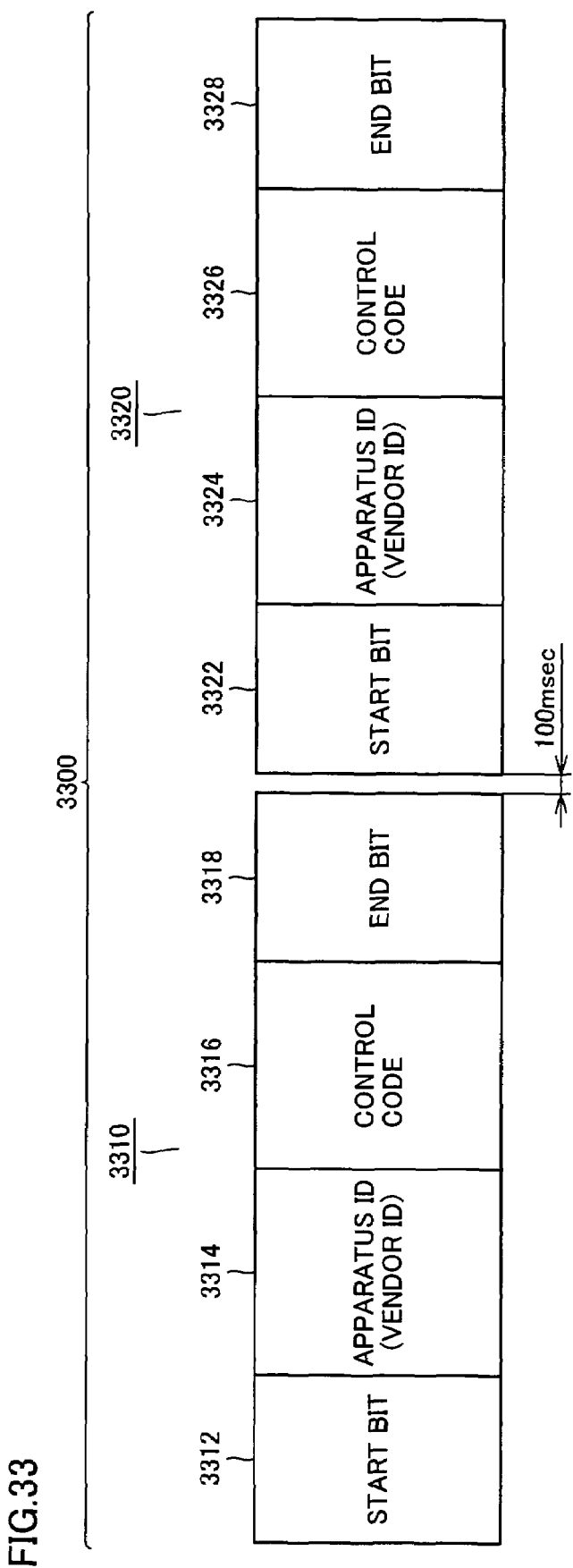
FIG. 33 represents a configuration of an optical control signal including a control code of a plurality of apparatuses.

With reference to FIG. 33, a remote control device according to a seventh embodiment of the present invention will be described. The remote control device of this embodiment differs from the various embodiments set forth above in that it has the function to transmit continuously a control signal to control a plurality of apparatuses. The hardware configuration of the remote control device of the seventh embodiment is similar to that of remote control device 100 of the first embodiment. Therefore, description of the hardware configuration will not be repeated.

FIG. 33 represents a configuration of an optical control signal 3300 having a control code of a plurality of apparatuses, transmitted by the remote control device of the seventh embodiment. Optical control signal 3300 includes a first control signal 3310 to control a first apparatus (for example, television 30), and a second control signal 3320 to control a second apparatus (for example, HDD recorder 40). First control signal 3310 includes regions 3312-3318 where data is stored. Second control signal 3320 includes regions 3322-3328 where data is stored.

The interval of transmission between first control signal 3310 and second control signal 3320 is, but not limited to 100 msec., for example. The interval may be shorter or longer.

The start bit representing the beginning of first control signal 3310 is stored in region 3312. First apparatus ID is stored in region 3314. The control code to control the first apparatus is stored in region 3316. The end bit representing the end of first control signal 3310 is stored in region 3318. Data is also stored in a similar arrangement in second control signal 3320.

When optical control signal 3300 of the configuration set forth above is transmitted from remote control device 100, an apparatus placed in the transmission range of remote control device 100 and having a matching apparatus ID executes an operation predefined by a control code in response to reception of an optical signal. Since a plurality of control codes are continuously received at respective apparatuses from remote control device 100, each apparatus executes an appropriate operation. Accordingly, with regards to apparatuses that can be used at the same time such as television 30 and HDD recorder 40, the user of remote control device 100 can control two types of apparatuses with one operation. The number of control signals included in optical control signal 3300 is not limited to two. Three or more control signals may be included in optical signal (not shown).

In order to continuously execute control with respect to a plurality of apparatuses, an instruction for each apparatus is temporarily stored in memory 512 of remote control device 100. When the input of all instructions is completed, a control signal corresponding to each instruction can be emitted when the user designates a transmission instruction. Alternatively, an instruction to control each apparatus can be stored in advance in the form of a program. In response to the user instructing execution of the relevant program, control signals can be transmitted continuously.

Figure 34:
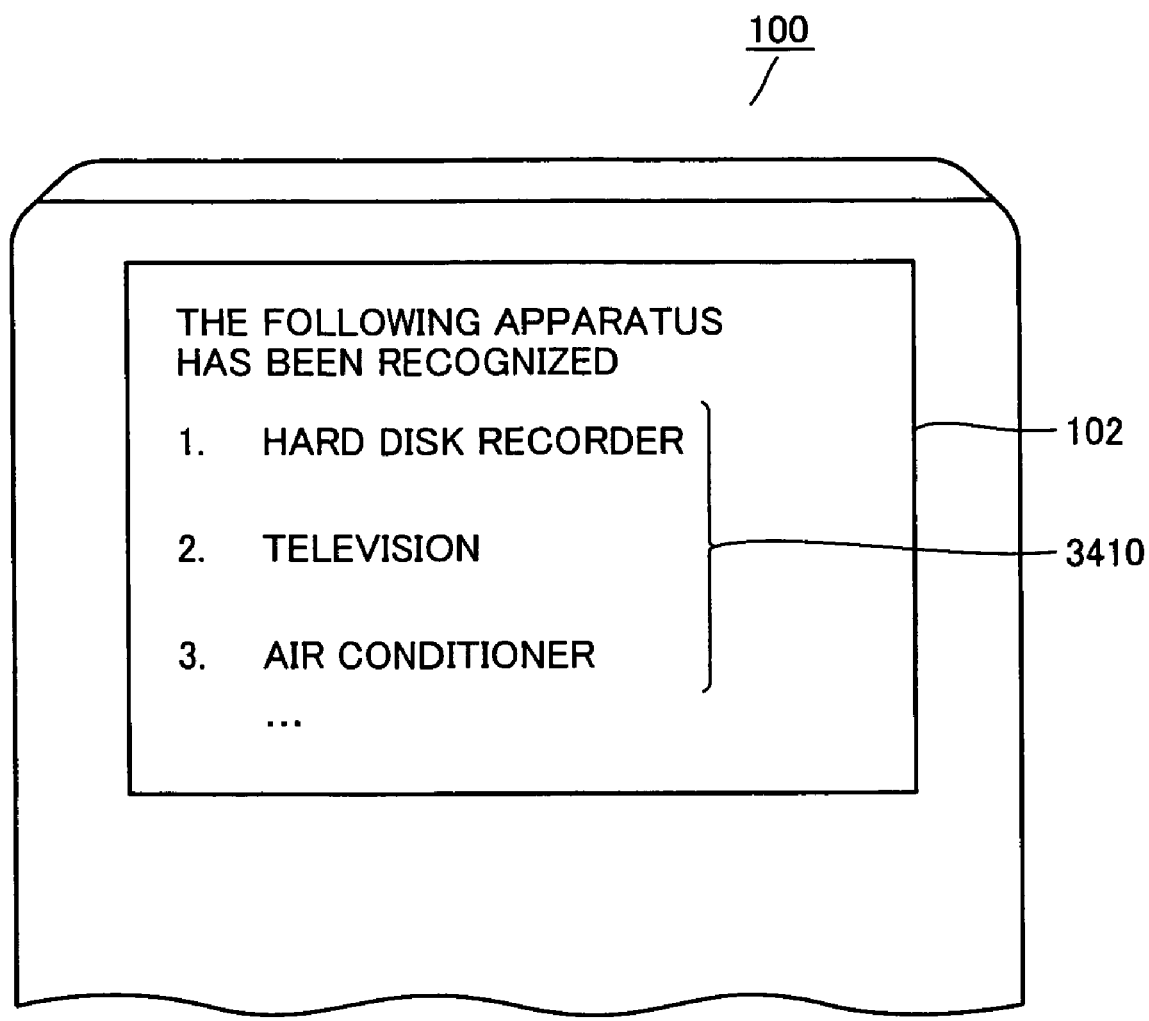
FIGS. 34 and 35 represent a display of an authentication screen of a remote control device according to an embodiment of the present invention.
Figure 35:
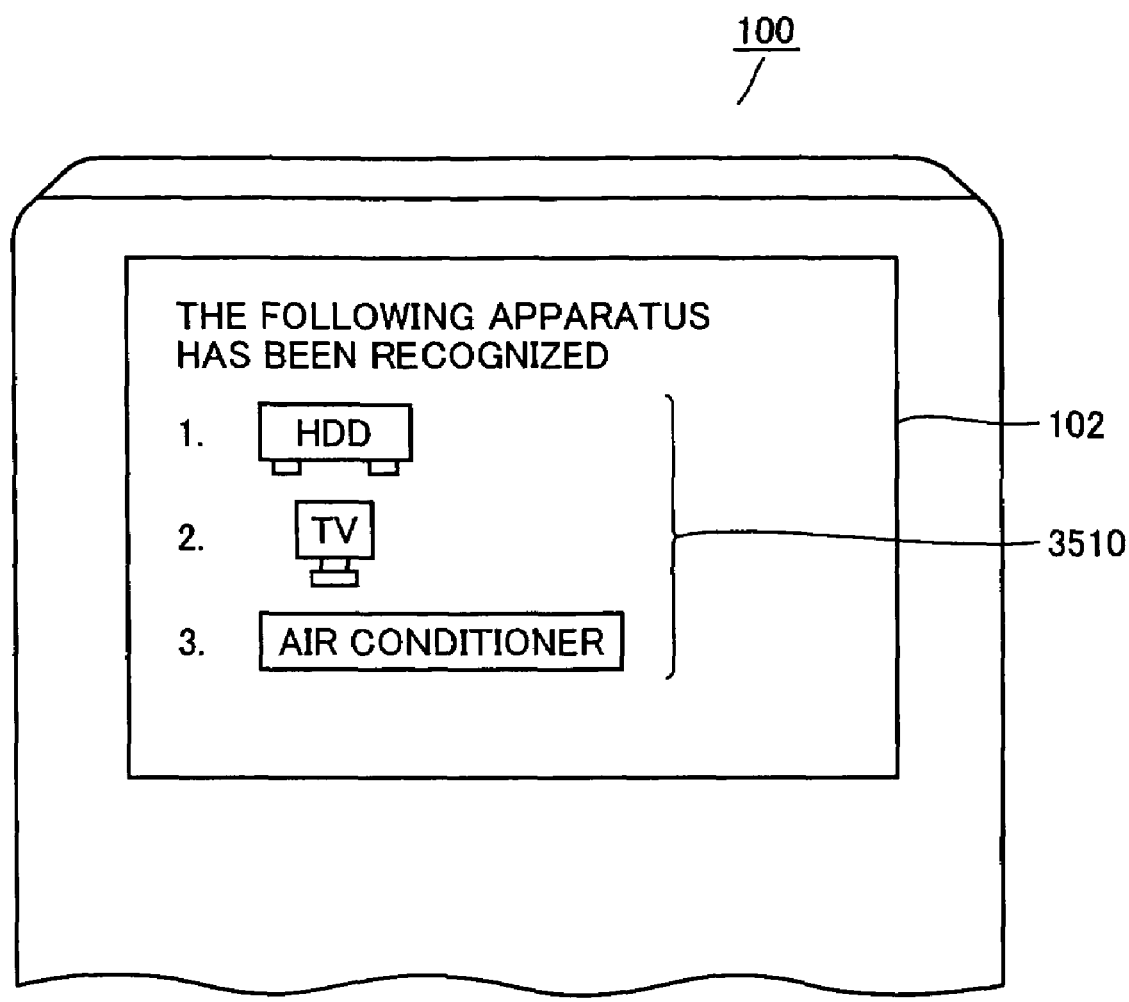

With reference to FIGS. 34 and 35, another aspect of a remote control device according to the present invention will be described. FIGS. 34 and 35 represent screen display modes of remote control device 100. Since remote control device 100 of the present invention is absent of an image pick up device such as a camera, the user cannot easily identify which apparatus is currently recognized by remote control device 100. By displaying an image representing the target apparatus (for example, the designation, apparatus number, or the like) at display unit 102, the user of remote control device 100 can easily identify which apparatus is recognized by remote control device 100.

Specifically, a message of "the next apparatus has been recognized" is displayed at display unit 102. Further, the apparatus recognized as item 3410, i.e. the item of "1. hard disk recorder, 2. television, 3. air conditioner" or the like is displayed.

Alternatively, an image representing an apparatus (for example, a preset icon) can be displayed instead of a designation representing an apparatus, as shown in FIG. 35. In this case, image data set in association with apparatus information is prestored in remote control device 100. Image data in association with the information of the specified apparatus can be read out and displayed at display unit 102.

Alternatively, an LED preset in correspondence to a relevant apparatus may be light-emitted when a certain apparatus is recognized, instead of an image display. Further, a sound may be issued instead of an image display or light emission. Accordingly, the user can readily confirm which apparatus is recognized.

The remote control device according to the present invention can receive an optical signal with the lateral spread of the optical signal emitted from an apparatus suppressed. Accordingly, the remote control device can be used to control an appropriate control target apparatus by directing the remote control device towards the direction of the control target apparatus under control even if the remote control device is absent of a finder of a camera. Thus, a remote control device capable of controlling a plurality of apparatuses while suppressing component increase can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control device controlling an apparatus emitting an optical signal containing identification information, comprising:
   an optical system accepting an optical signal with incoming restricted in a lateral direction,
   a reception unit receiving said optical signal via said optical system,
   a conversion unit converting the optical signal received by said reception unit into an electrical signal,
   an identification information obtaining unit obtaining said identification information from said electrical signal,
   a storage unit storing control data to control said apparatus,
   a display unit providing a display to identify said apparatus based on the identification information obtained by said identification information obtaining unit,
   an input unit accepting an input of an instruction,
   a generation unit generating a control signal to control said apparatus based on said instruction and said control data stored in said storage unit, and
   an emitting unit emitting said control signal.

2. The remote control device according to claim 1, wherein said optical system includes a first slit portion restricting incoming of said optical signal.

3. The remote control device according to claim 2, wherein an opening of said first slit portion is formed such that a longitudinal direction of said opening corresponds to a vertical direction when said remote control device is operated.

4. The remote control device according to claim 3, wherein said optical system further includes a second slit portion arranged between said first slit portion and said reception unit.

5. The remote control device according to claim 1, wherein said optical system includes an entrance port gathering an optical signal.

6. The remote control device according to claim 5, wherein said entrance port includes a cylindrical lens.

7. The remote control device according to claim 5, wherein said entrance port includes a collimator lens.

8. The remote control device according to claim 5, wherein said optical system further includes a slit portion arranged between said entrance port and said reception unit.

9. The remote control device according to claim 1, further comprising:

a detection unit detecting an intensity of an optical signal received by said reception unit, and a notification unit notifying the intensity of said optical signal.

10. The remote control device according to claim 9, wherein said notification unit includes an intensity display unit displaying the intensity of said optical signal.

11. The remote control device according to claim 10, wherein said intensity display unit includes a light emitting unit emitting a color corresponding to the intensity of said optical signal.

12. The remote control device according to claim 10, wherein said intensity display unit includes a light emitting unit emitting light of a preset color, and an intensity control unit controlling the intensity of light emitted by said light emitting unit based on the intensity of said optical signal.

13. The remote control device according to claim 9, wherein said notification unit includes an audio signal generation unit generating an audio signal according to said intensity, and an audio output unit providing an audio output based on said audio signal.

14. The remote control device according to claim 1, wherein said storage unit stores said control data for each of a plurality of said apparatuses, said display unit provides a display to identify each of said apparatuses, said input unit accepts an input of each instruction for each of said apparatuses, said generation unit generates each said control signal for each of said apparatuses based on each said instruction and each said control data, and said emitting unit emits each said control signal.

15. The remote control device according to claim 1, wherein said emitting unit includes a transmission unit transmitting said control signal via a communication line.

16. The remote control device according to claim 1, further comprising a control data obtaining unit obtaining control data to control said apparatus from an external source.

17. The remote control device according to claim 16, wherein said control data obtaining unit includes a request transmission unit transmitting a transmission request of said control data to said apparatus, and an obtaining unit obtaining said control data transmitted from said apparatus in response to said transmission request.

18. The remote control device according to claim 16, wherein said control data obtaining unit includes a request transmission unit transmitting a transmission request of said control data to an information supply apparatus conducting distribution of said control data via a communication line, and an obtaining unit obtaining said control data transmitted by said information supply apparatus in response to said transmission request.

19. The remote control device according to claim 16, wherein said control data obtaining unit includes a control data reception unit receiving control data emitted by a remote control device exclusive to said apparatus, and a write unit writing control data received by said control data reception unit into said storage unit.

20. The remote control device according to claim 16, wherein said storage unit stores said identification information and said control data in association for said apparatus, said remote control device further comprising a confirmation unit confirming whether said identification information contained in the optical signal received by said reception unit is stored in said storage unit or not, wherein said control data obtaining unit ceases obtaining said control data when said identification information is stored in said storage unit.

21. The remote control device according to claim 1, further comprising a narrowing port narrowing outgoing of said optical control signal with signal outgoing restricted in the lateral direction, said narrowing port arranged in a traveling direction of a signal emitted by said emitting unit.

22. The remote control device according to claim 21, wherein said narrowing port includes a slit portion restricting outgoing of said optical control signal.

23. The remote control device according to claim 22, wherein said optical system includes a slit portion restricting incoming of said optical signal, said slit portion restricting incoming of said optical signal being identical to said slit portion restricting outgoing of said optical control signal.

24. A remote control device controlling an apparatus emitting an optical signal containing identification information, comprising:

a casing, an optical system provided at said casing, accepting an optical signal with incoming restricted in a lateral direction, a reception unit receiving said optical signal via said optical system, a detection unit detecting an intensity of the optical signal received by said reception unit, an intensity display unit displaying the intensity detected by said detection unit, a conversion unit converting the optical signal received by said reception unit into an electrical signal, an identification information obtaining unit obtaining said identification information from said electrical signal, a control data obtaining unit accepting an input of control data to control said apparatus, a storage unit storing said control data, a display unit providing a display of a designation of said apparatus based on identification information obtained by said identification information obtaining unit, an input unit accepting an input of an instruction, a generation unit generating an optical control signal to control said apparatus based on said instruction and control data stored in said storage unit, and an emitting unit, provided at said casing, emitting said optical control signal with outgoing restricted in the lateral direction.

* * * * *